(12) United States Patent
Yamaoka et al.

(10) Patent No.: US 12,230,065 B2
(45) Date of Patent: Feb. 18, 2025

(54) GATE APPARATUS, GATE SYSTEM, AND GATE CONTROL METHOD

(71) Applicant: NEC Corporation, Tokyo (JP)

(72) Inventors: Kazuhiko Yamaoka, Tokyo (JP); Keito Tachizaki, Tokyo (JP); Kenichi Oosawa, Tokyo (JP); Junya Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 139 days.

(21) Appl. No.: 17/622,312

(22) PCT Filed: Jun. 29, 2020

(86) PCT No.: PCT/JP2020/025594
§ 371 (c)(1),
(2) Date: Dec. 23, 2021

(87) PCT Pub. No.: WO2022/003801
PCT Pub. Date: Jan. 6, 2022

(65) Prior Publication Data
US 2022/0351548 A1 Nov. 3, 2022

(51) Int. Cl.
*G07B 15/00* (2011.01)
*G06V 40/16* (2022.01)
*G06V 40/60* (2022.01)
*G07C 9/10* (2020.01)
*G07C 9/37* (2020.01)

(52) U.S. Cl.
CPC ............ *G06V 40/60* (2022.01); *G06V 40/172* (2022.01); *G07B 15/00* (2013.01); *G07C 9/10* (2020.01); *G07C 9/37* (2020.01)

(58) Field of Classification Search
CPC ........ G06V 40/60; G06V 40/172; G07C 9/10; G07C 9/257
See application file for complete search history.

(56) References Cited

U.S. PATENT DOCUMENTS

2007/0122011 A1* 5/2007 Takizawa ................. G07C 9/10
382/118
2013/0048716 A1* 2/2013 Gobetti ................. G09G 3/3406
235/380

(Continued)

FOREIGN PATENT DOCUMENTS

JP 3038475 U 6/1997
JP 2005063172 A * 3/2005

(Continued)

OTHER PUBLICATIONS

International Search Report for PCT Application No. PCT/JP2020/025594, mailed on Sep. 15, 2020.

*Primary Examiner* — Nabil H Syed

(57) ABSTRACT

A gate apparatus includes a gate unit which is disposed on a second plane crossing a first plane in which an authentication object moves in one direction and which partitions a moving space of the authentication object from another space, an inclined face which is formed on the gate unit to cross the first plane and the second plane and which is inclined upwardly from the first plane, a display configured to display an image on the inclined face, and an image acquisition unit configured to capture an image of the authentication object in proximity to the display.

14 Claims, 17 Drawing Sheets

(56) References Cited

U.S. PATENT DOCUMENTS

| | | | |
|---|---|---|---|
| 2018/0018837 A1* | 1/2018 | Fankhauser | G07C 9/257 |
| 2020/0279269 A1* | 9/2020 | Wagner | G06F 21/606 |
| 2023/0169810 A1* | 6/2023 | Steiert | G07C 9/10 |
| | | | 235/93 |

FOREIGN PATENT DOCUMENTS

| JP | 2006202342 A | * | 8/2006 |
|---|---|---|---|
| JP | 2007-148987 A | | 6/2007 |
| JP | 2012-212367 A | | 11/2012 |
| JP | 2019-159795 A1 | | 9/2019 |

* cited by examiner (A)

(B)

GATE APPARATUS, GATE SYSTEM, AND GATE CONTROL METHOD

This application is a National Stage Entry of PCT/JP2020/025594 filed on Jun. 29, 2020, the contents of all of which are incorporated herein by reference, in their entirety.

TECHNICAL FIELD

The non-limiting embodiments relate to a gate apparatus, a gate system, and a gate control method.

BACKGROUND ART

Conventionally, a technology is known for extracting facial images of users from images acquired by image acquisition devices such as cameras, for authenticating users through comparison between feature quantity and databases, and for controlling gates such as wickets installed in railroad stations according to authentication results. Patent Document 1 discloses a technology relating to automatic ticket gates using the aforementioned facial recognition technology.

The technology of Patent Document 1 is designed to carry out processes for authenticating users from images captured by imaging sections installed in automatic ticket gates and for comparing users with ticket information independently read from electronic media. In addition, the technology employs a mechanism for preventing improper passage through automatic ticket gates.

CITATION LIST

Patent Document

Patent Document 1: Japanese Patent Application Publication No. 2019-159795

SUMMARY

Technical Problem

This disclosure aims to improve gate apparatuses disclosed in Patent Document 1.

Solution to Problem

To solve the aforementioned problem, in a first aspect of the non-limiting embodiment, a gate apparatus includes a gate unit which is disposed on a second plane crossing a first plane in which an authentication object moves in one direction and which partitions a moving space of the authentication object from another space, an inclined face which is formed on the gate unit to cross the first plane and the second plane and which is inclined upwardly from the first plane, a display configured to display an image on the inclined face, and an image acquisition unit configured to capture an image of the authentication object in proximity to the display.

In a second aspect of the non-limiting embodiment, a gate control method includes the steps of: displaying an image on a display face inclined upwardly from a first plane in a gate unit configured to partition a moving space in which an authentication object moves on the first plane in one direction from another space, capturing an image of the authentication object in proximity to the display face, and identifying the authentication object from the captured image.

DESCRIPTION OF EXEMPLARY EMBODIMENTS

In facial recognition using an imaging section having a very broad scope of imaging, it is necessary to process many data in order to extract feature quantity of facial images of users subjected to authentication from many users' images included in captured images. Using an imaging section having a very narrow scope of imaging, the authentication by facial recognition suffers from a problem in that captured images do not necessarily include an image of a user subjected to facial recognition.

In addition, users reflected in images captured by an imaging section may have various orientations in their faces; hence, the imaging section may not necessarily capture an image having feature quantity appropriate for comparison with pre-registered feature quantity.

Moreover, automatic ticket gates need to authenticate many passengers in each unit of time and allow passengers to pass therethrough; hence, it is necessary to rapidly process the acquired data for facial recognition.

Accordingly, it is necessary to develop a technology for facilitating confirmation of gate-usage statuses in the aforementioned gate apparatuses.

This disclosure aims to provide a gate apparatus, a gate system, and a gate control method with the minimum configuration below, which can solve the aforementioned problems.

Figure 1A:
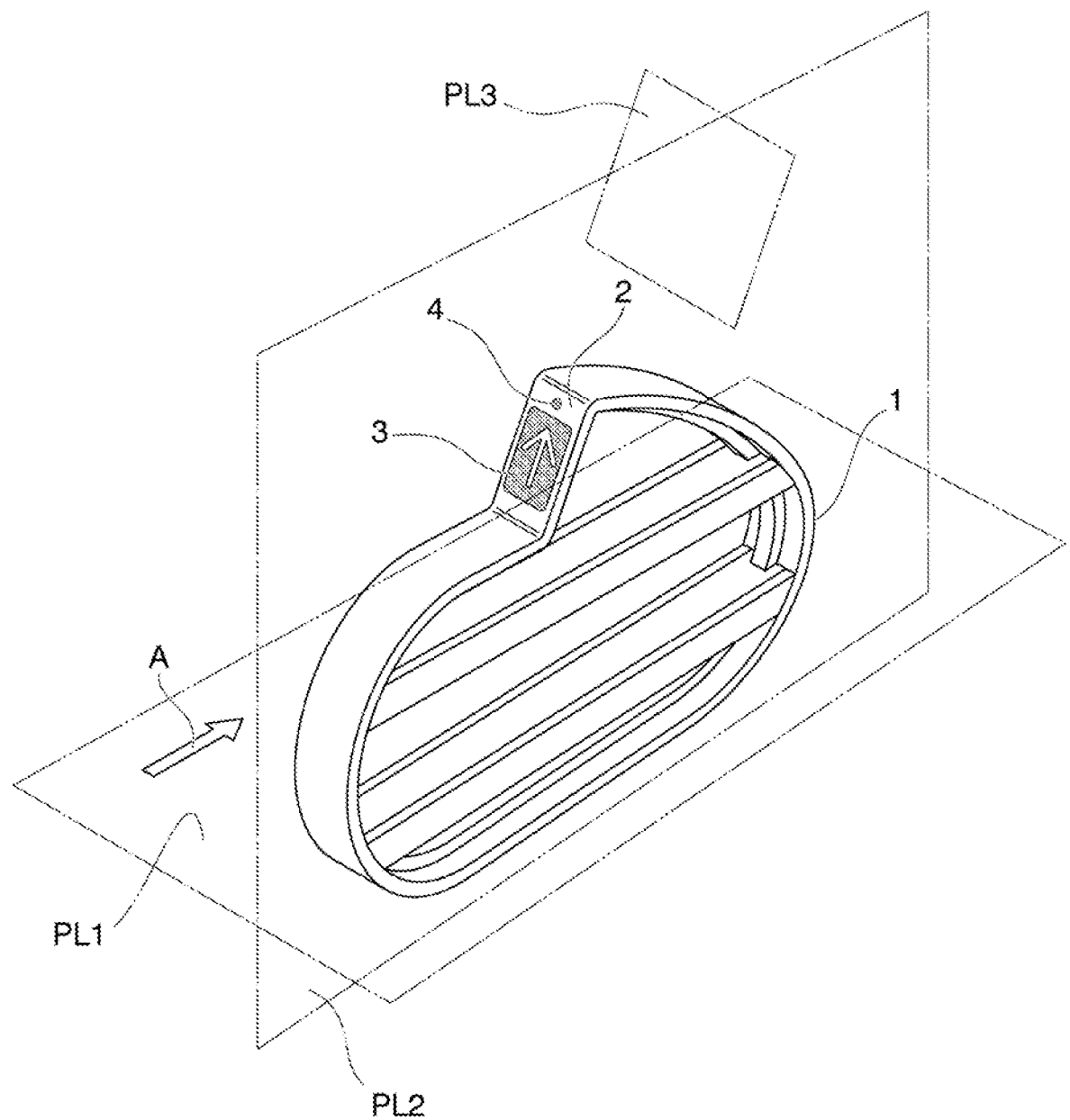
FIG. 1A is a perspective view showing an exterior appearance of an exemplary minimum configuration of a gate apparatus according to this disclosure.

The minimum configuration of a gate apparatus according to this disclosure will be described with reference to FIG. 1A.

The gate apparatus includes a gate unit 1 which is disposed along a first plane (e.g., a vertical plane shown by dashed lines PL2 in FIG. 1A) crossing a first plane (e.g., a horizontal plane shown by dashed lines PL1 in FIG. 1A) allowing an authenticating object to move in one direction (shown by an arrow A in FIG. 1A) and which is configured to separate a moving space of the authenticating object (e.g., a space of a passage through a gate) from other spaces (other than the passage), an inclined face 2 formed along a third plane (shown by dashed lines PL3 in FIG. 1A) which crosses the first plane and the second plane and which is inclined upwardly from the first plane, a display 3 configured to display images on the inclined face 2, and an image acquisition unit 4 configured to acquire an image in proximity to the display 3. For example, the inclined face 2 having an angle above 0 degrees and below 90 degrees to the first plane PL1 is an inclined face parallel to the third plane PL3 perpendicular to the second plane PL2 or crossing the second plane PL2 at an angle other than a right angle.

The gate apparatus having the aforementioned configuration is configured to guide an authenticating object (e.g., a passenger of a railroad service), which is moving on the floor surface serving as the first plane, into a passage partitioned by the gate unit 1. In addition, the gate apparatus is configured to guide a sight line of an authenticating object, which is moving along the gate unit 1, toward the display 3 on the upwardly-inclined face 2. Accordingly, the image acquisition unit 4 is able to acquire an image of a passenger whose face is directed to a predetermined scope of viewing by moving the sight line toward the display 3.

Figure 1B:
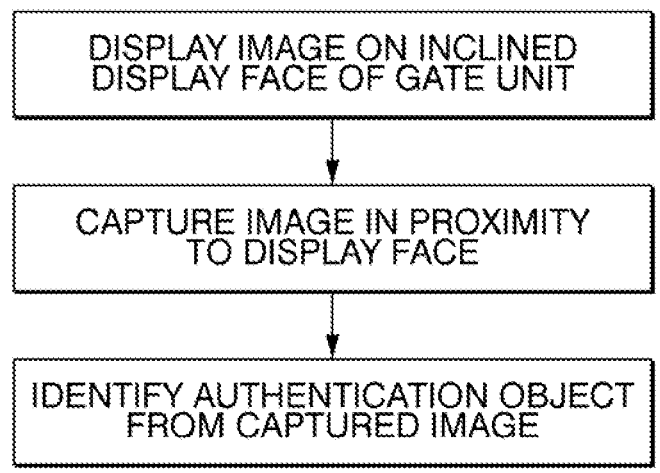
FIG. 1B is a flowchart showing a process of a gate control method executed by the gate apparatus of FIG. 1A.

In other words, the illustrated gate control method implements a process of displaying an image on a display screen upwardly inclined to the first plane of the gate unit configured to separate the moving space in which an authenticating object may move in one direction as shown in FIG. 1B from other spaces, a process of capturing an image in proximity to the display screen, and a process of identifying the authenticating object from the captured image.

That is, a facial image acquired by the image acquisition unit 4 should be limited to a facial image of a user who may turn his/her face toward the display 3 since the user's attention is directed to the display 3. This may reduce an amount of image data to be processed to extract a feature quantity, thus facilitating recognition of the feature quantity and therefore reducing the time required for authentication.

First Exemplary Embodiment

Next, a gate system including the gate apparatus according to the first exemplary embodiment of this disclosure will be described with reference to FIGS. 2 through 7. In this connection, common configurations of FIG. 1A are denoted by the same reference signs; hence, their descriptions will be simplified here.

Figure 2:
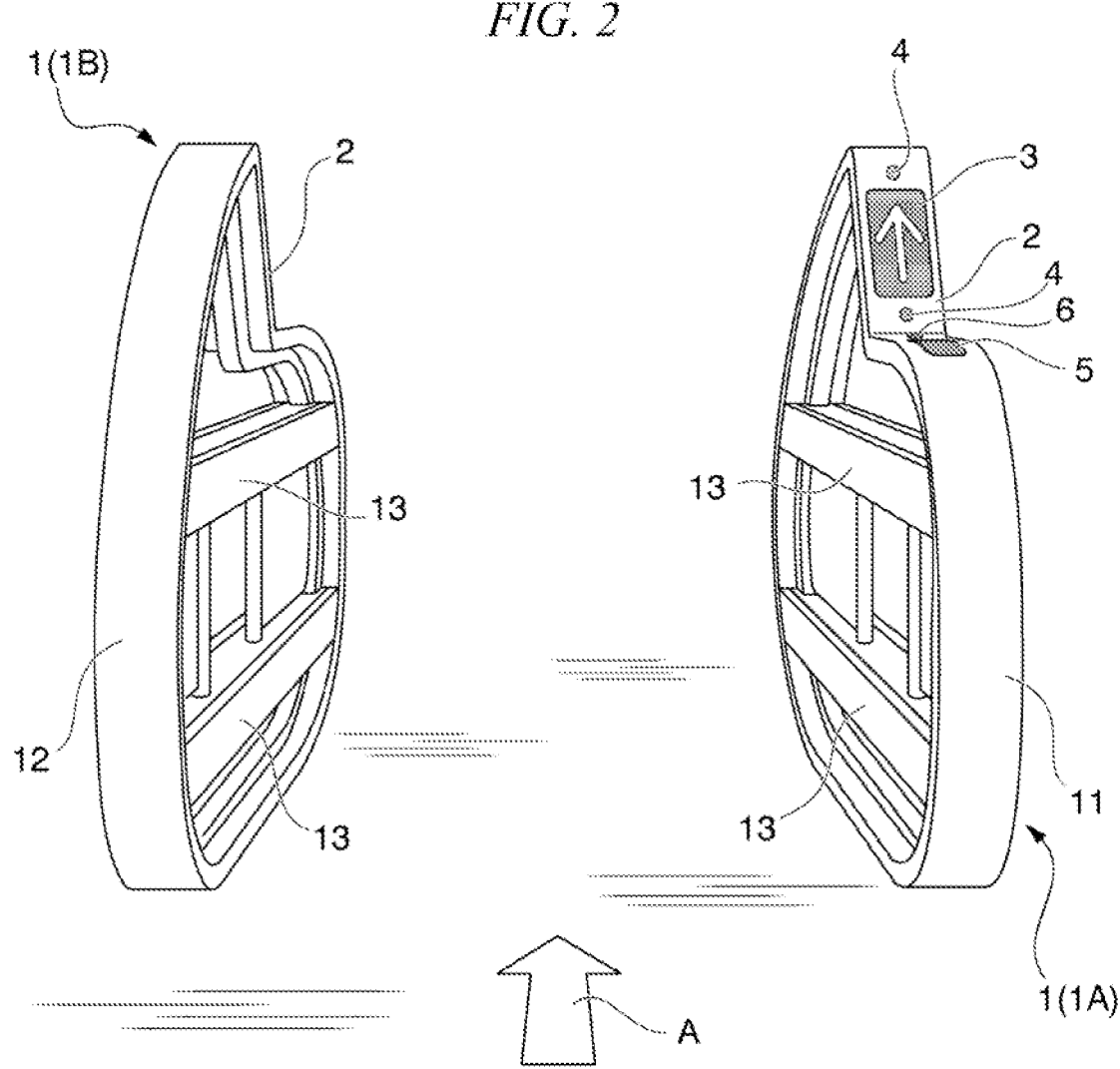
FIG. 2 is an obliquely-upward perspective view of a gate system equipped with the gate apparatus according to the first exemplary embodiment of this disclosure.
Figure 3:
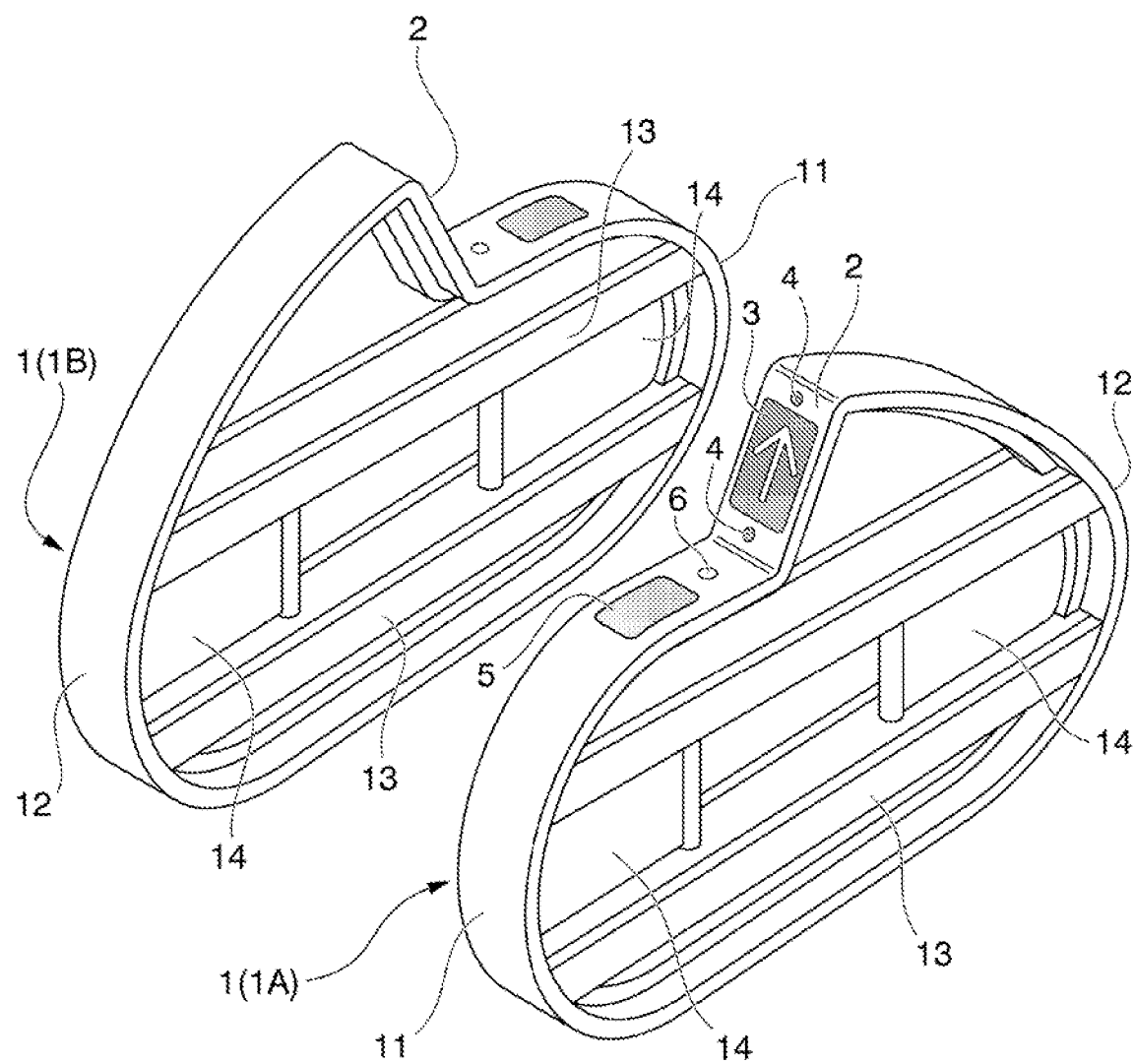
FIG. 3 is a frontal-upward view of equipment of FIG. 2.

The gate system of the first exemplary embodiment has a two-unit configuration in which the gate units 1 (1A, 1B) are spaced from each other in a horizontal direction. In FIGS. 2-3, the gate units 1A, 1B are disposed in an opposite direction such that the inclined face 2 of the right-side gate unit 1A is directed in a front side while the inclined face 2 of the left-side gate unit 1B is directed in a rear side, wherein the gate units 1A, 1B are located to partition an internal space of a gate passage formed therebetween from other spaces outside the gate passage. That is, the gate unit 1 is disposed along the second plane (e.g., an illustrated vertical plane) crossing the first plane (e.g., an illustrated horizontal plane) serving as a floor surface of a gate passage, thus partitioning the surrounding space of a gate into a passage and other areas.

For example, each of the gate units 1A, 1B has a frame-shaped structure formed by bending a reinforced plastic board. As a whole, each gate unit 1 includes a minor-diameter bent section 11, a major-diameter bent section 12, and the inclined face 2 disposed at the ends of the bent sections 11, 12. The frame shape indicates a shape formed along outlines of a partial area of a plane covering the gate units 1A, 1B (e.g., an area of a shape in a rectangular view to the second plane covering the gate units 1A, 1B) in which at least part of an internal area from outlines serves as a space. Therefore, a free area corresponding to the space allows air to circulate therethrough. Interconnection members 13 are interposed between the minor-diameter bent section 11 and the major-diameter bent section 12 in consideration of improving the strength of a frame-shaped structure. In addition, a pair of board-shaped flapper gates 14 which can be revolved about a vertical axis is arranged between the interconnection members 13. As shown in FIGS. 2-3, two flapper gates 14 are attached to two points of the gate unit 1A such that one flapper gate 14 is disposed close to the minor-diameter bent section 11 while another flapper gate 14 is disposed close to the major-diameter bent portion 12. The flapper gates 14 are each made of a board or a frame-shaped member which can be opened or closed at an automatic ticket gate at a railroad station, wherein the flapper gates 14 may be each projected inside the passage from the gate unit 1 so as to close the passage between the gate units 1A, 1B, thus preventing a passenger from passing through the passage against his/her intention.

In this connection, it is possible to adopt various methods other than the aforementioned method in which board-shaped members are revolved about a vertical axis to move in or out of the space between the gate units 1A, 1B, such as a method in which board-shaped members temporarily stored in the gate units 1A, 1B are projected to prevent a passenger from passing through the passage or another method in which bar-shaped members move in or out. That is, the flapper gates 14 are each configured to move between a closed position, in which each flapper gate 14 actually exists in the space for a user to pass therethrough and which prevents the passenger from passing through the space, and an escape position which does not exist at the closed position for preventing a passenger to pass therethrough. As the escape position, it is possible to appropriately select an escaping operation according to the setup status of the gate units 1A, 1B, such as an operation to escape the flapper gates 14 by storing the flapper gates 14 in the gate units 1A, 1B or by folding the flapper gates 14 along the gate units 1A, 1B, an operation to escape the flapper gates 14 by storing the flapper gates 14 under the floor of the space between the gate units 1A, 1B, and an operation to escape the flapper gates 14 by moving the flapper gates 14 above the gate units 1A, 1B.

The display 3 is attached onto the inclined face 2 to optically display predetermined information. As the display 3, it is possible to adopt a liquid-crystal display, a light-emitting display for selectively emitting light using many light sources such as LEDs, and a display means using a reflection plate for simply reflecting an image projected from a projector or the like attached to the ceiling of a room.

A pair of image acquisition units 4 configured to acquire images are attached to the upper and lower positions of the display 3 on the inclined face 2, wherein they are configured to input an image in an obliquely-upper direction to which the inclined face 2 is inclined. As the image acquisition units 4, for example, it is possible to adopt a camera having electronic components configured to convert visual light and infrared light into electric signals.

Figure 4:
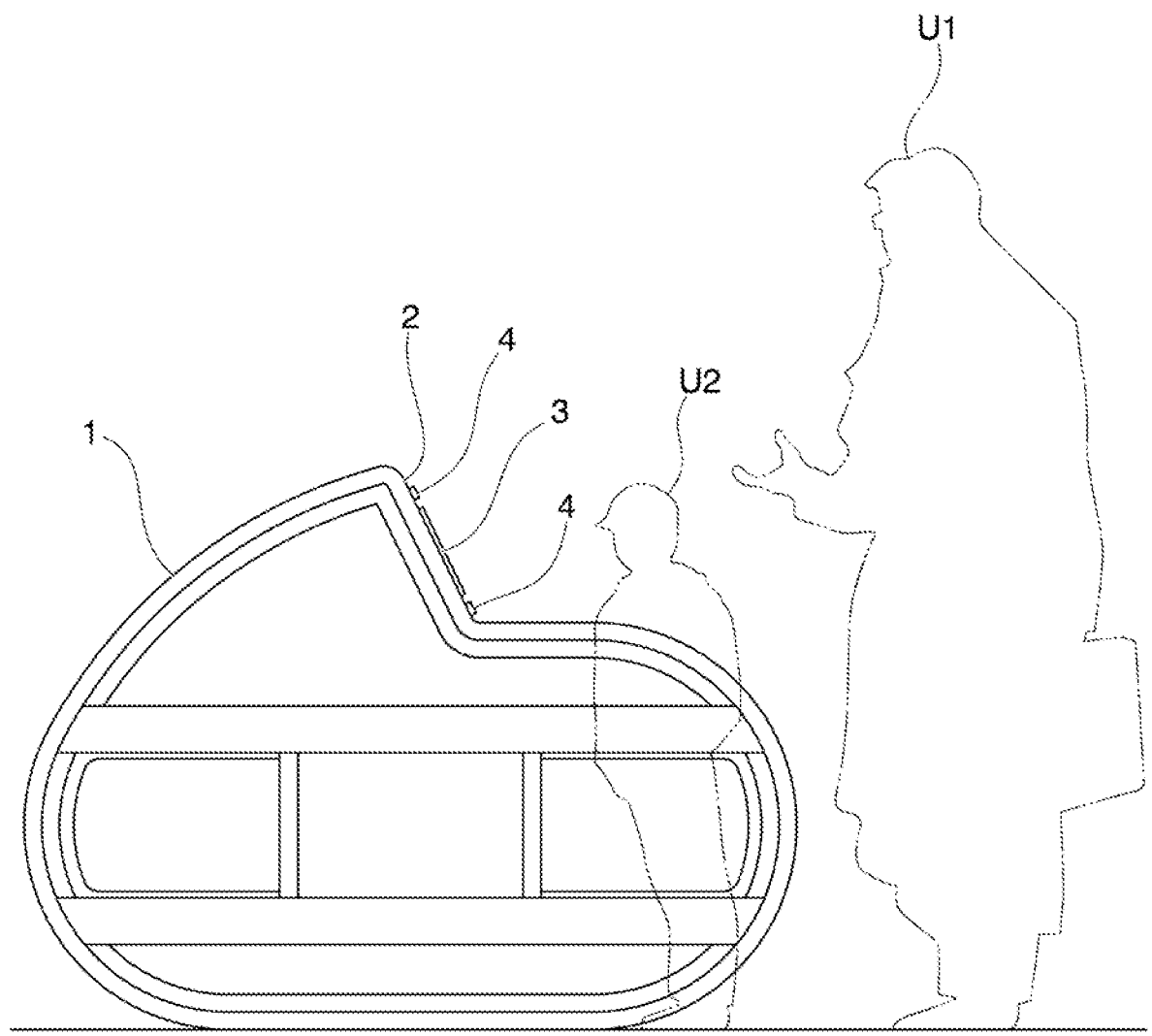
FIG. 4 is a side view of one aspect of the first exemplary embodiment.
Figure 5:
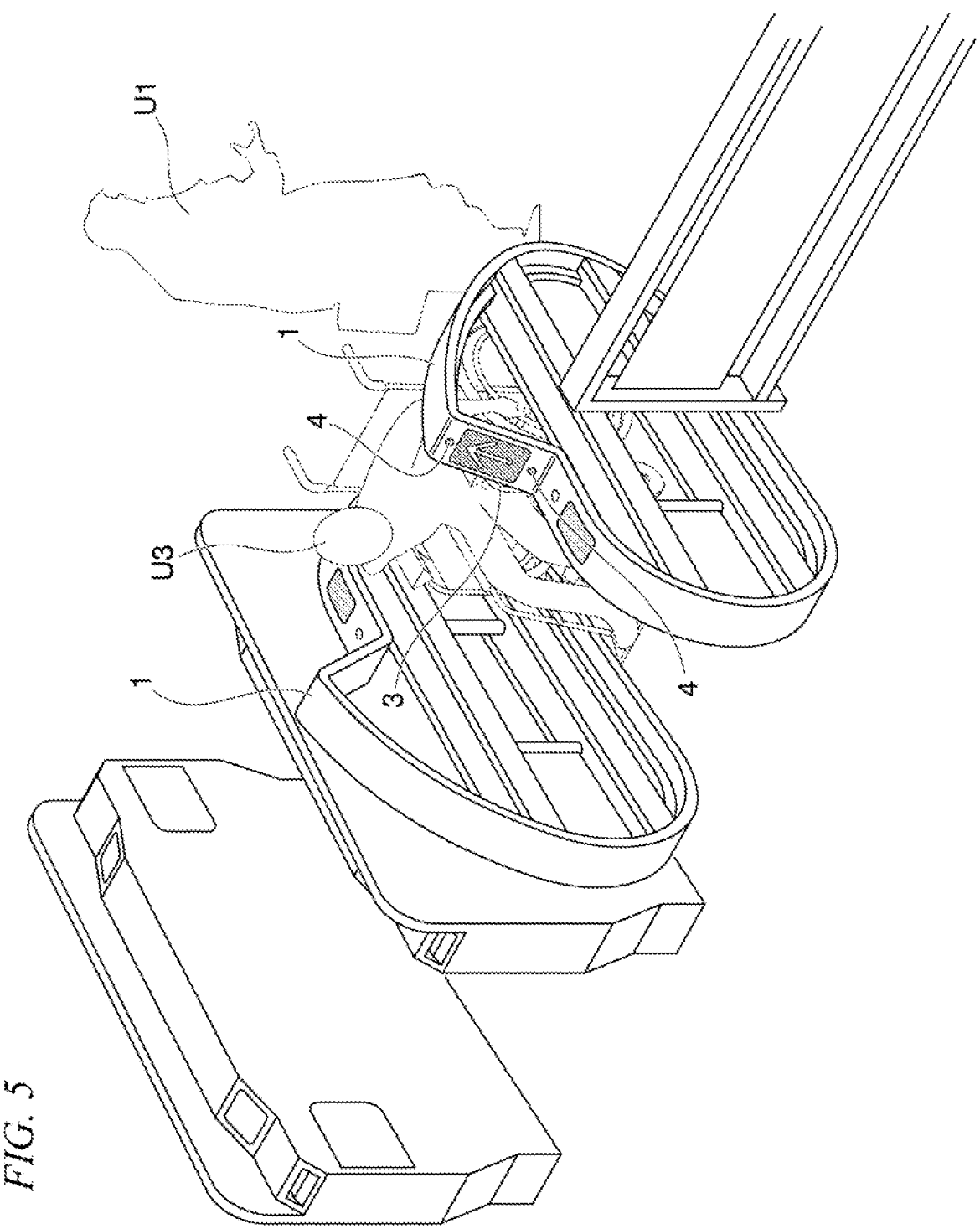
FIG. 5 is a front view of another aspect of the first exemplary embodiment.

The dimensions of the gate units 1A, 1B are each determined in height and orientation such that a pair of image acquisition units 4 disposed at the upper and lower positions of the display 3 on the inclined face 2 can capture faces in a front direction with respect to an adult user U1 who is 170 cm tall and a child user U2 who is 110 cm tall as shown in FIG. 4 as well as a wheelchair user U3 whose face is located approximately at the same height as a child as shown in FIG. 5.

The aforementioned exemplary illustrations include a pair of image acquisition units 4 disposed at the upper and lower positions of the display 3; however, it is possible to locate them at the right and left positions of the display 3. In this case, it is preferable that the image acquisition units 4 be set to different incident angles against incoming rays of light or the image acquisition units 4 be attached to the inclined face 2 at different angles in consideration of different heights of imaging objects.

In addition, it is possible to arrange fans inside the gate units 1A, 1B each having a frame-shaped structure in proximity to the displays 3, thus facilitating air circulation in the periphery to prevent stagnation of air in the peripheral area, to prevent image distortions due to dew condensation, and to alleviate a risk of infectious diseases. Moreover, it is possible to arrange air purifiers having filters providing dedusting functions or bacteria-elimination functions at positions in the middle of air flows caused by fans, thus circulating air in the periphery of the gate apparatuses.

A data read-write unit 5 configured to read or write data such as optical data of barcodes, magnetic data of magnetic stripes, and RF (radio frequency) communication data and an audio input/output unit 6 including a microphone and a speaker used to receive and output audio signals with users or an interface device having both functions to receive and output audio signals are attached to the upper face of the gate unit 1.

Figure 6:
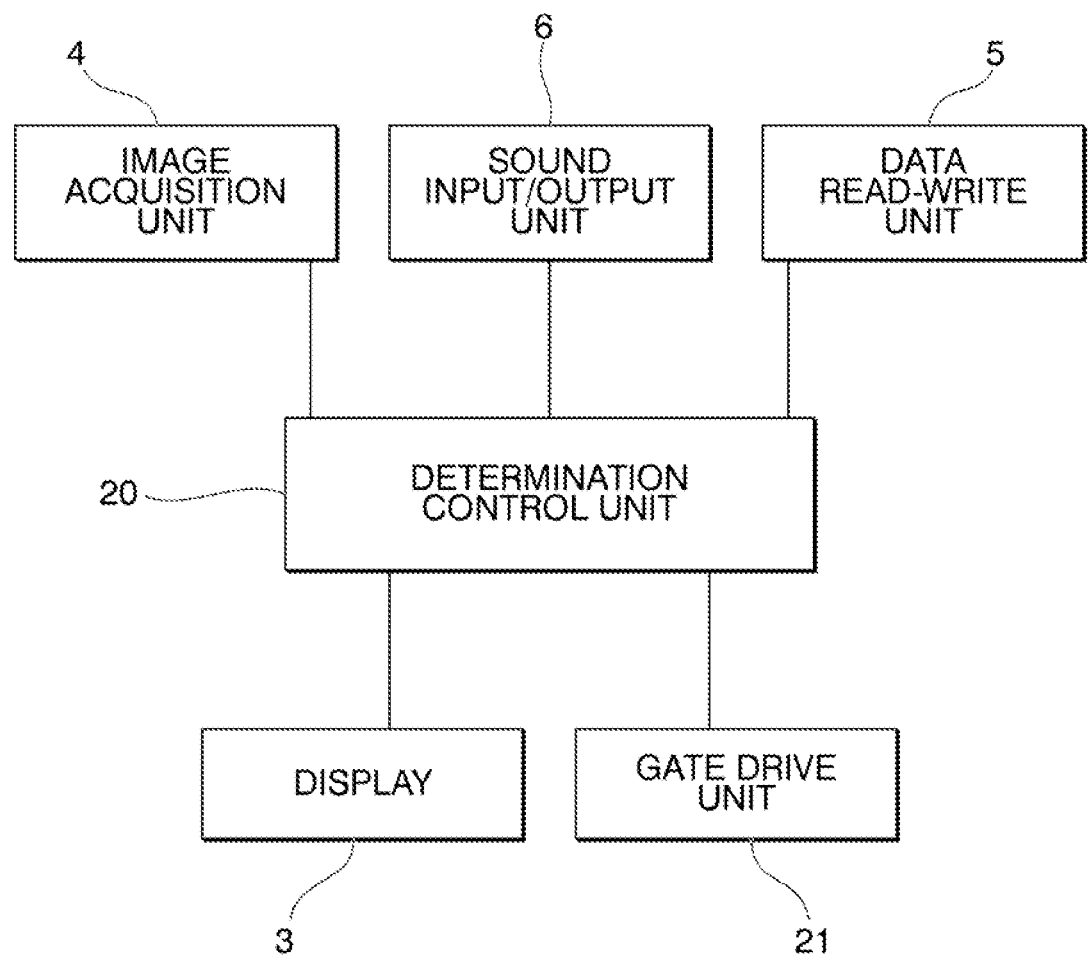
FIG. 6 is a block diagram of the gate system according to the first exemplary embodiment.

A determination control unit 20 configured to control a gate system according to the first exemplary embodiment will be described with reference to FIG. 6.

The determination control unit 20 is configured to extract feature quantity of faces from image data supplied by the image acquisition units 4, to identify a user according to a match degree between facial feature quantity and feature-quantity data pre-registered in a database, and to compare the user with ticket information, thus determining whether or not to permit the user to pass through the gates. Alternatively, it is possible to determine whether or not to permit the user to pass through the gates using the data supplied from the data read-write unit 5 in addition to or instead of the image data supplied from the image acquisition units 4. In this connection, it is possible to omit the data read-write unit 5 from the gate unit 1, wherein it is possible to determine whether or not to permit the user to pass through the gates according to facial recognition solely using the image data supplied from the image acquisition units 4. For example, the aforementioned ticket information may include at least one of a boarding section, a boarding date-and-time (a boarding-permitted period), a train number, user-specified information, and a fare-charged amount.

When the gate apparatus permits the user to pass through the gates solely using the data supplied from the data read-write unit 5, it is possible to omit facial recognition using the image data supplied from the image acquisition units 4 or an image acquisition process using the image acquisition units 4.

The image acquisition units 4 may acquire an image relating to a user who might have been permitted to pass through the gates using the data (e.g., commuter-ticket information) supplied from the data read-write unit 5 such that the data will be stored on a storage unit of a host computer (not shown) in association with the data. Thereafter, when the user uses the gate system again, the image acquisition units 4 may acquire a facial image of the user, and therefore it is possible to determine whether or not to permit the user to pass through the gates using the aforementioned data which are stored on the storage unit in association with the user's facial image.

The audio input/output unit 6 configured to input or output audio data is connected to the determination control unit 20.

The determination control unit 20 is configured to control the display 3 to display predetermined image data on the screen. In addition, the determination control unit 20 is configured to control a gate drive unit 21 configured to control electric motors to drive the flapper gate 14, thus operating the flapper gate 14 as necessary. In this connection, the display 3 may display an image representing the station staff for the purpose of remote communication over a telephone in addition to predetermined image data such as date as to whether or not to permit the user to pass through gates, a user's advancing direction, advertisements and the like.

Figure 7:
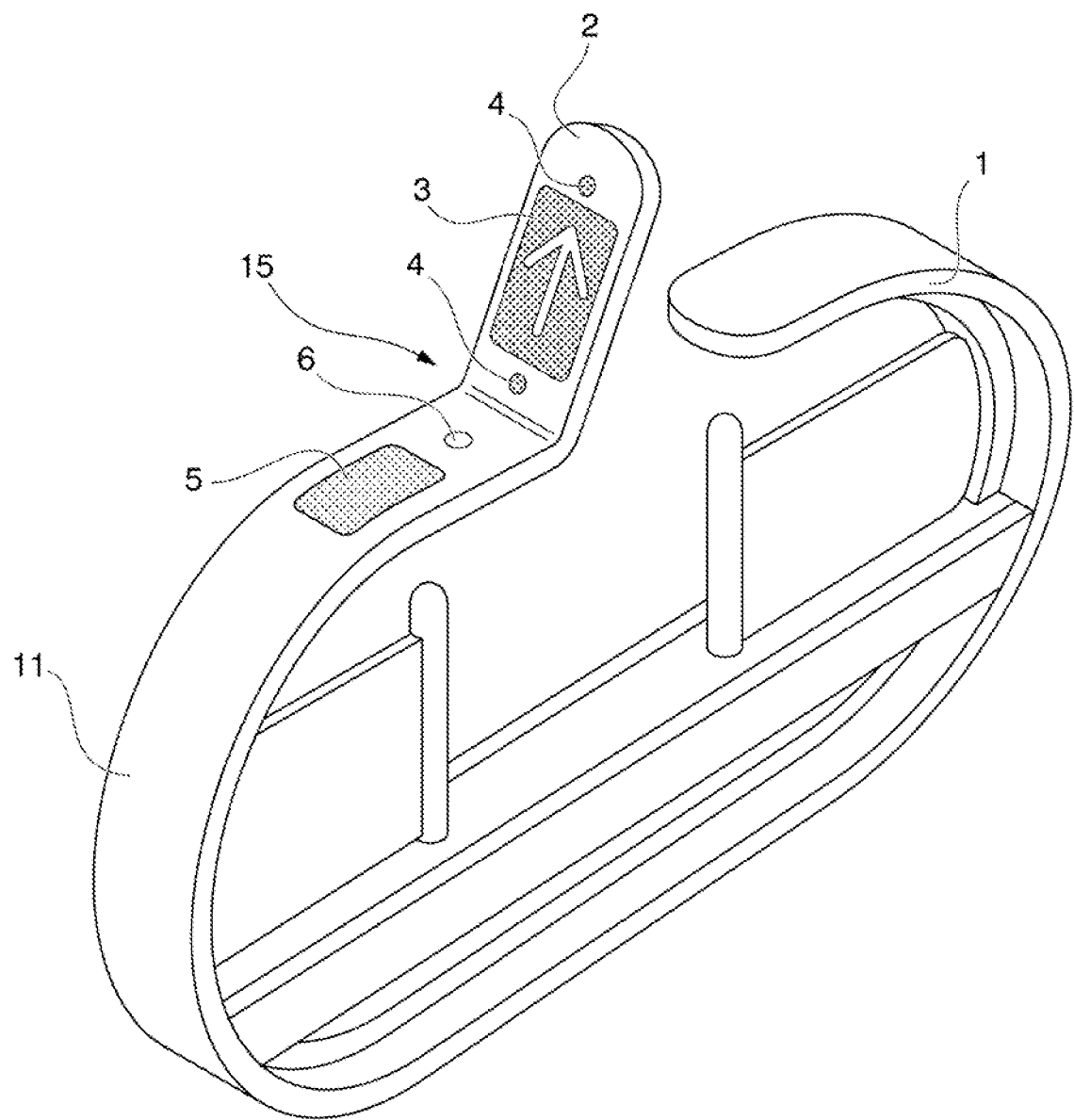
FIG. 7 is perspective view partly enlarging a display according to the first exemplary embodiment.

As shown in FIG. 7, the inclined face 2 for mounting the display 3 is formed continuously with the edge of the minor-diameter bent section 11 through a bent portion 15, for example, wherein the inclined face 2 is configured to rotate about an axis to change its inclined angle. A change of the inclined angle may be adjusted according to various conditions such as the setup condition of a gate system, e.g., an angle of ambient light or illumination, a relationship between the height of a floor surface and the height of the gate unit 1 when installing the gate system, wherein it is not necessarily essential for the inclined face 2 to normally adjust its inclined angle, and therefore it is possible to fix the inclined angle at a predetermined angle after installing the gate system. In addition, it is possible to provide a movable type of the inclined face 2 equipped with a driving device to adjust the inclined angle, wherein the inclined face 2 can be configured to adjust its inclined angle by a user's operation or to automatically adjust its inclined angle at an appropriate angle according to the status of image data acquired by the image acquisition units 4 (e.g., the inclined angle will be adjusted upwardly with respect to a facial image showing a lack of its upper part or the inclined angle will be adjusted downwardly with respect to a facial image showing a lack of its lower part) or results of visual recognition by a user to view an image displayed on the display 3.

The gate system having the aforementioned configuration will be described in conjunction with its gate control method.

The gate system will be in a standby state to await an input of data from at least one of the image acquisition units 4, the data read-write unit 5, and the audio input/output unit 6 based on image data acquired by the image acquisition units 4 or while an approach sensor installed in the gate system or located in the vicinity of the gate system does not detect a user approaching the gates.

When a user approaches a gate passage between the gate unit 1A and the gate unit 1B, the determination control unit 20 starts extracting feature quantity of facial data from image data captured by the image acquisition units 4. At this time, the display 3 of the gate unit 1A may display a guidance image to guide the sight line of a user thereto, e.g., an arrow showing a user's advancing direction, characters representing "Admission of Entrance", or a blue color representing an admission of entrance. On the other hand, the display 3 of the gate unit 1B may display an image to prevent a user from entering in an opposite direction to the arrow A shown in FIG. 2, e.g., a symbol "x", characters representing "Prohibition of Passage", or a red color representing the prohibition of passage. For the sake of this process, the display 3 and the image acquisition units 4 are attached to the inclined face 2, and therefore it is possible for a user to easily view a displayed image when the user turns down the sight line thereof, whilst it is possible for the image acquisition units 4 to extract feature quantity close to a frontal-facial image of a user by guiding the sight line of a user toward the display 3.

As the displayed content of the display 3, it is possible to further display the following content.

When a facial-recognition result indicates a user as a foreigner who may wish messages to be displayed in a foreign language, the display 3 may change displayed characters from the Japanese language to the foreign language. A change of the display language can be realized by registering the nationality of a user (or the language information associated with the nationality of a user) prior to facial recognition, wherein upon successfully completing facial recognition, the display language will be changed to the registered language.

It is possible to provide a gate system with a function to read information from a smartphone (e.g., a Bluetooth (a registered trademark) function or a beacon function to specify the position based on Bluetooth (a registered trademark) signals) such that a user's desired language is registered in the smartphone, thus changing the display language of the display 3 based on the information acquired from the smartphone.

A user who does not wish to transfer his/her own facial information to a server or the like (e.g., a host computer configured to store facial information in this disclosure) may carry out facial recognition using the user's own smartphone as follows.

(1) Store a user's facial photo in a smartphone.
(2) Upon taking a photo at a gate system, transmit the photo to the smartphone using beacon signals or Bluetooth (a registered trademark) communication.
(3) The smartphone may carry out facial recognition using a facial image received from the gate system or its stored facial image, thus transmitting success-decision information as to whether or not to successfully recognize the facial image to the gate system.
(4) The gate system controls an open/close operation of the flapper gate 14 based on the success-decision information from the smartphone.

Using the image acquisition units 4 attached to the upper and lower positions of the display 3, it is possible to capture an image which may approximate a front face of a user as accurately as possible according to the height of a user or when a wheelchair user passes through the gates. Specifically, it is possible to acquire an image needed for facial recognition irrespective of the high height or the low height of a user or the wheelchair condition of a user.

Due to a determination of feature quantity being impossible, the gate system should further determine whether ticket data needed for an admission of entrance is input by the data read-write unit 5, wherein upon determining an admission of entrance, the gate system may permit the user to pass through the gates. A permission operation may cause the display 3 to display characters representing "Admission of Entrance", a symbol "O", or a blue color representing an admission of entrance, thus inhibiting the gate drive unit 21 to operate the flapper gates 14 (which operates to block a user's progression between gates).

When both the determination result of feature quantity and the determination result according to the data from the data read-write unit 5 indicate prohibition of entrance, the gate system should disallow a user to pass through the gates so as to cause the display 3 to display a symbol "x", characters representing "Prohibition of Passage", or a red color representing prohibition of passage. In addition, the gate drive unit 21 may operate the flapper gates 14 to block a passage between gates or may establish a ready state to operate the flapper gates 14 to block the passage between gates when an intrusion sensor or the like is arranged independently to detect intrusion of a user.

On the other hand, a station staff may hail a user while some message is displayed on the display 3 or some sound is produced by the audio input/output unit 6 when the user inputs sound with the audio input/output unit 6 or operates an unillustrated emergency button to ask for assistance of a station staff, when the gate system cannot determine whether to permit a user to pass through the gates in a predetermined period of time or when the gate system makes a decision as to whether or not to permit a user to pass through the gates multiple times in a predetermined period of time. In addition, the gate system may establish a ready state to allow for a conversation between a user and a station staff so that the station staff can judge by himself/herself whether to permit a user to pass through the gates according to at least one piece of information among a user's image acquired by the image acquisition unit 4 and a sound input to the audio input/output unit 6.

In the aforementioned gate system, the gate units 1 each having a frame-shaped structure allow air to easily circulate in a width direction of gates or left-right directions shown in FIGS. 2-3 such that air can escape in left-right directions as a user passes through the gates or as wind is blown into the gates; hence, it is possible to alleviate a user's discomfort due to wind resistance or the like. Since air may circulate in left-right-rear directions, it is possible to reduce air resistance entailed by an open/close operation of the flapper gates 14 each having a board-like shape; hence, it is possible to miniaturize drive motors used to operate the flapper gates 14 or to reduce drive power thereof.

Using a function of enabling air to pass through the gate units 1 each having a frame shape, it is possible to provide the gate units 1 with mesh-shaped filters or electrical dustcollecting devices utilizing static electricity, thus cleaning air in the periphery of the gate apparatus.

According to the first exemplary embodiment in which the gate units 1 are each formed in a frame-shaped structure, it is possible to reduce weights of the gate units 1 and to enable air circulation in a crossing direction of the gate units 1.

Upon operating the flapper gates 14, it is possible to block the user's passing through the passage along the gate units 1 as necessary. In addition, it is possible to block the user's passing through the gates using the flapper gates 14 according to comparison results based on facial recognition.

In addition, the image acquisition units 4 disposed in the upper and lower positions of the display 3 are able to acquire facial images of users having various heights who may direct their lines of sight toward the display 3.

By changing an inclination of the inclined face 2 according to determination results of images acquired by the image acquisition units 4, it is possible to re-display messages or to re-capture images by changing angles of the display 3 and the image acquisition units 4 relative to users; hence, it is possible to display messages easily recognizable by users or to capture images in an appropriate imaging direction or an appropriate direction of incident light.

The gate system of the first exemplary embodiment is designed to form a single passage between the gate units 1A and 1B, however, it is possible for the gate system to serve as multiple gates by providing multiple lines of passages.

Since the gate units 1 are oriented in such a way that their inclined faces are directed opposite each other, the gate system can produce messages displayed on the displays 3 and images captured by the image acquisition units 4 with respect to users advancing differently in opposite directions along the gate units 1.

Since the flapper gates 14 are arranged at the edges of the gate unit 1 (i.e., an entrance side and an exit side of a user who may pass through the gates), it is possible to operate the flapper gates 14 at appropriate timings irrespective of any passing directions of users.

Second Exemplary Embodiment

Figure 8:
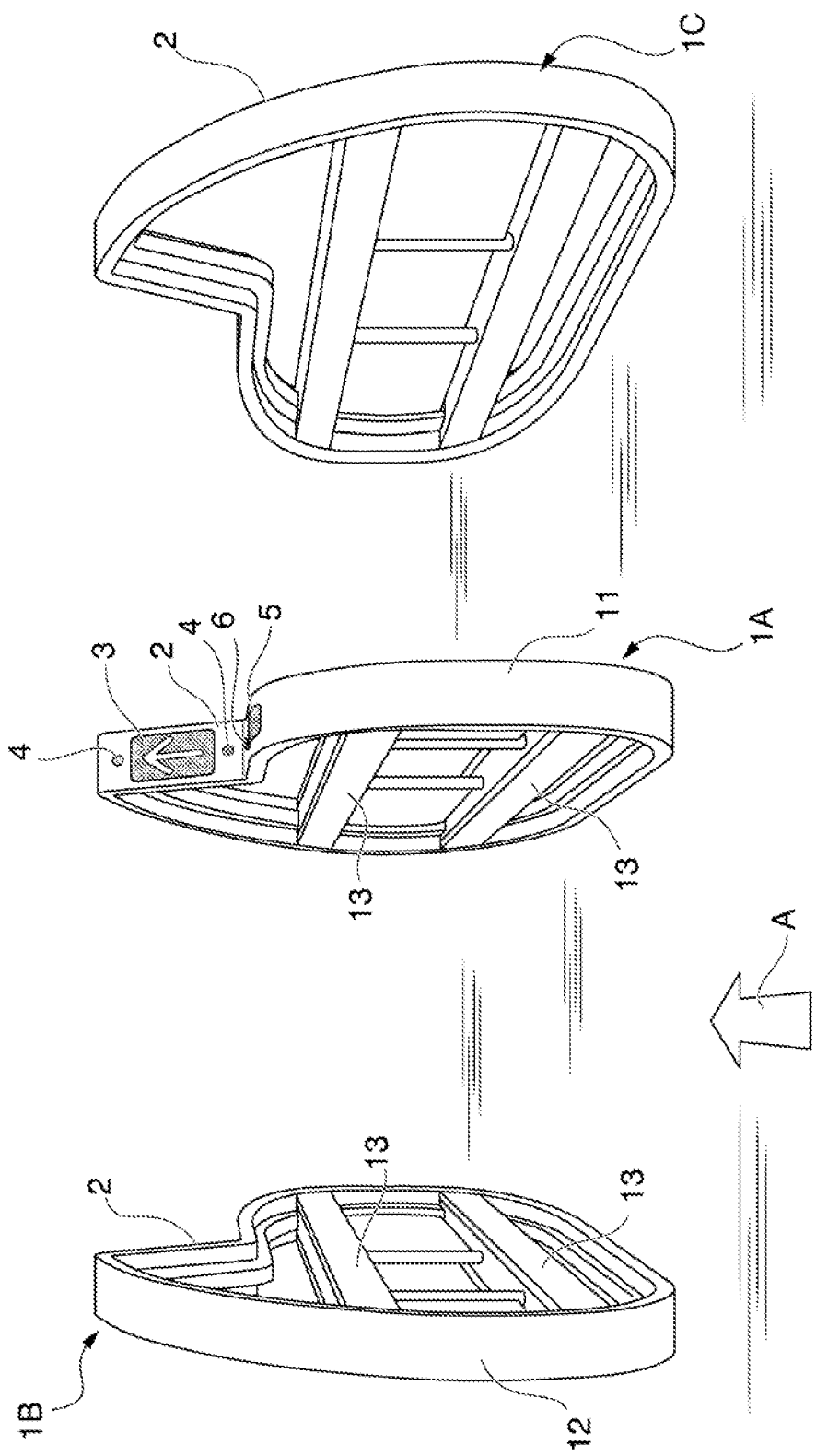
FIG. 8 is a perspective view of a gate system in its upward-front view according to the second exemplary embodiment.

FIG. 8 shows the second exemplary embodiment.

The second embodiment further includes a gate unit 1C having the same configuration as the gate units 1A, 1B located on the right side of the gate unit 1A of the first exemplary embodiment, wherein the inclined face 2 of the gate unit 1C is directed rearwardly in comparison with the inclined face 2 of the gate unit 1A.

According to the second exemplary embodiment, it is possible to arrange two passages differently between the gate units 1A and 1B and between the gate units 1A and 1C. The second exemplary embodiment operates in a similar manner to that of the first exemplary embodiment to perform authentication and to control the flapper gates 14 after determining whether a user attempts to pass through the gates between the gate units 1A and 1B or between the gate units 1A and 1C in a direction of the arrow A (i.e., a direction from the front side to the rear side in FIG. 8) based on the image data acquired by the image acquisition units 4 of the gate unit 1A. When a user attempts to pass through gates in an opposite direction to the arrow A, the second exemplary embodiment operates in a similar manner to that of the first exemplary embodiment to perform authentication and to control the flapper gates 14 based on the image data acquired by the image acquisition units 4 installed in either the gate unit 1A or the gate unit 1C.

The second exemplary embodiment is configured to control two passages by alternately arranging three gate units 1A, 1B, and 1C in opposite directions.

To cope with a user who may attempt to pass through the gates in the direction of the arrow A between the gate units 1A and 1B and between the gate units 1A and 1C, it is possible to modify the gate unit 1A by arranging two sets of image acquisition units 4 on opposite sides (i.e., the front side and the rear side in FIG. 8) while dividing the display 3 into left and right screens to transmit different pieces of information to a user who may attempt to pass through the left-side passage or the right-side passage. Alternatively, it is possible to display on the left and right screens of the display 3 respectively one piece of information for a user who may attempt to pass through the right-side passage or another piece of information for a user who may attempt to pass through the left-side passage with a predetermined time difference.

Third Exemplary Embodiment

Figure 9:
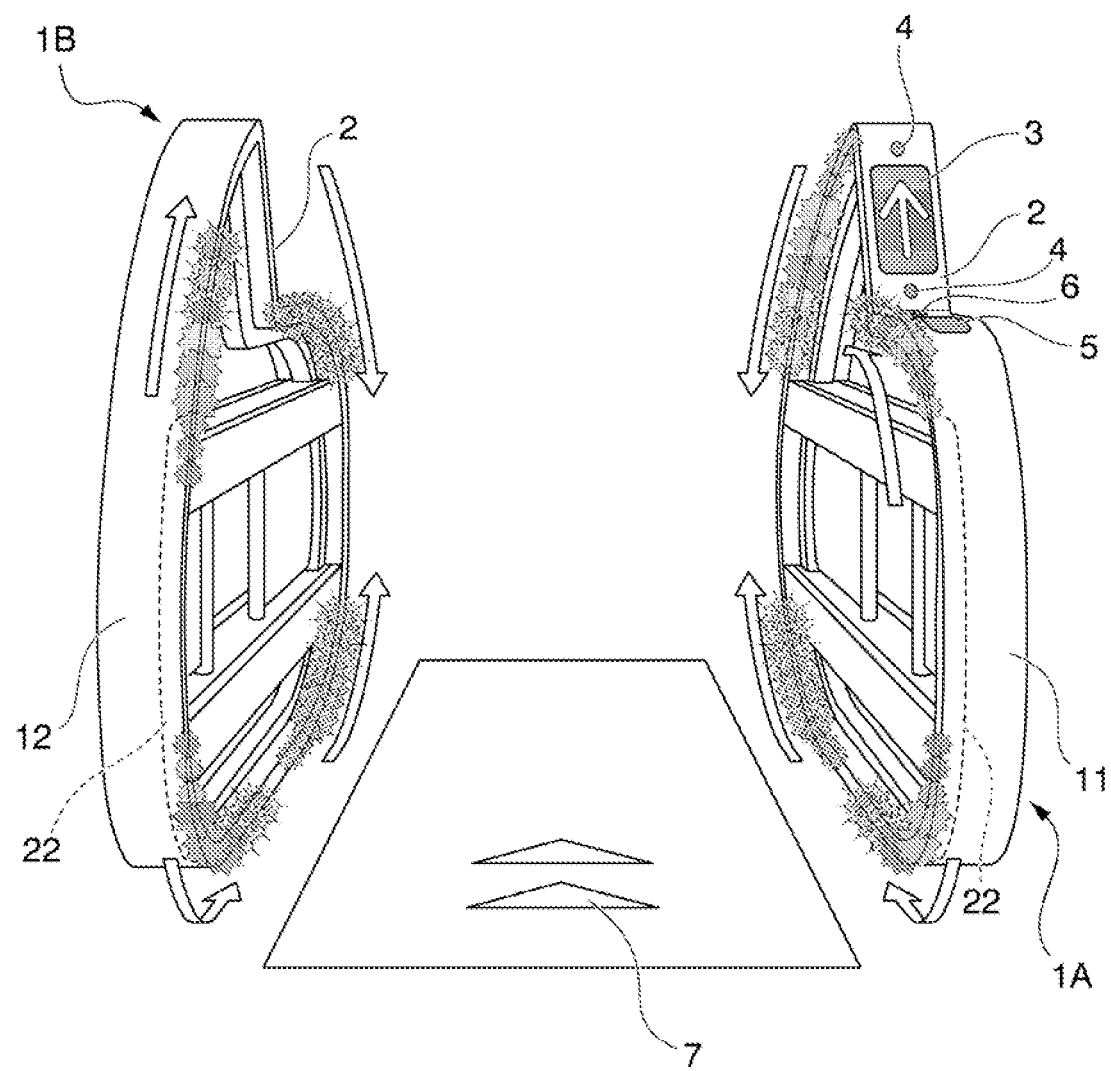
FIG. 9 is a perspective view of a gate system in its upward-front view according to the third exemplary embodiment.

FIG. 9 shows the third exemplary embodiment.

The third exemplary embodiment further includes a floor display 7 on the floor surface between the gate units 1A and 1B.

Similar to the display 3, the floor display 7 can be configured of any display means to display image information such as a liquid-crystal display, a light-emitting display for selectively emitting light using many light sources such as LEDs, and a display means using a reflection plate for simply reflecting an image projected from a projector or the like attached to the ceiling of a room.

For example, the floor display 7 is configured to display characters or figures representing advertisements and admission of entering through the gates, figures representing user's progressing directions, and various types of messages.

In addition, it is possible to provide displays 8 along the edges of the minor-diameter bent section 11 and/or the major-diameter bent sections 12 as shown by dotted lines in FIG. 9. The displays 8 may be configured of long-and-narrow band-shaped light-emitting members aligned along the edges or point sources of light such as light-emitting diodes aligned along the edges with predetermined intervals of distance therebetween, wherein it is possible to show a progressing direction of a user by moving light-emitting positions or it is possible to produce an effect of attracting a user's attention by turning on/off light entirely over light-emitting positions.

It is possible to clearly indicate a user's admission/prohibition of passing through the gates using a configuration of emitting light from the edges of the gate units 1A, 1B, 1C in synchronism with a user's progressing direction, wherein when the user attempts to walk through the passage between the gate units 1A and 1B, light is emitted from the opposite edges on both sides of the gate unit 1A and along the edge of the gate unit 1B beside the gate unit 1A (while light is not emitted from the other edge of the gate unit 1B beside the gate unit 1C).

In addition, it is possible to employ a thermography technique to extract infrared-region signals from image data produced by the image acquisition units 4 and to display infrared-region signals together with images or to employ an infrared sensor and a thermo-camera in addition to the image acquisition units 4, thus additionally providing a new function to determine an admission or prohibition of passage based on determination results using infrared techniques. Based on determination results as to an admission or prohibition of passage, it is possible to display a message representing an admission or prohibition of passage on the display 3 or to carry out a process of closing the flapper gates 14 in order to prohibit the user's passing through the gates.

When the temperature of a person who may attempts to pass through the gate apparatus is above a predetermined regulation value, e.g., 37.5° C., for example, it is possible to display a message representing prohibition of passage on the display 3, to carry out a process of closing the flapper gates 14 in order to prohibit the user's passing through the gates, and to inform a station staff of a declaration representing prohibition of passage.

Fourth Exemplary Embodiment

Figure 10:
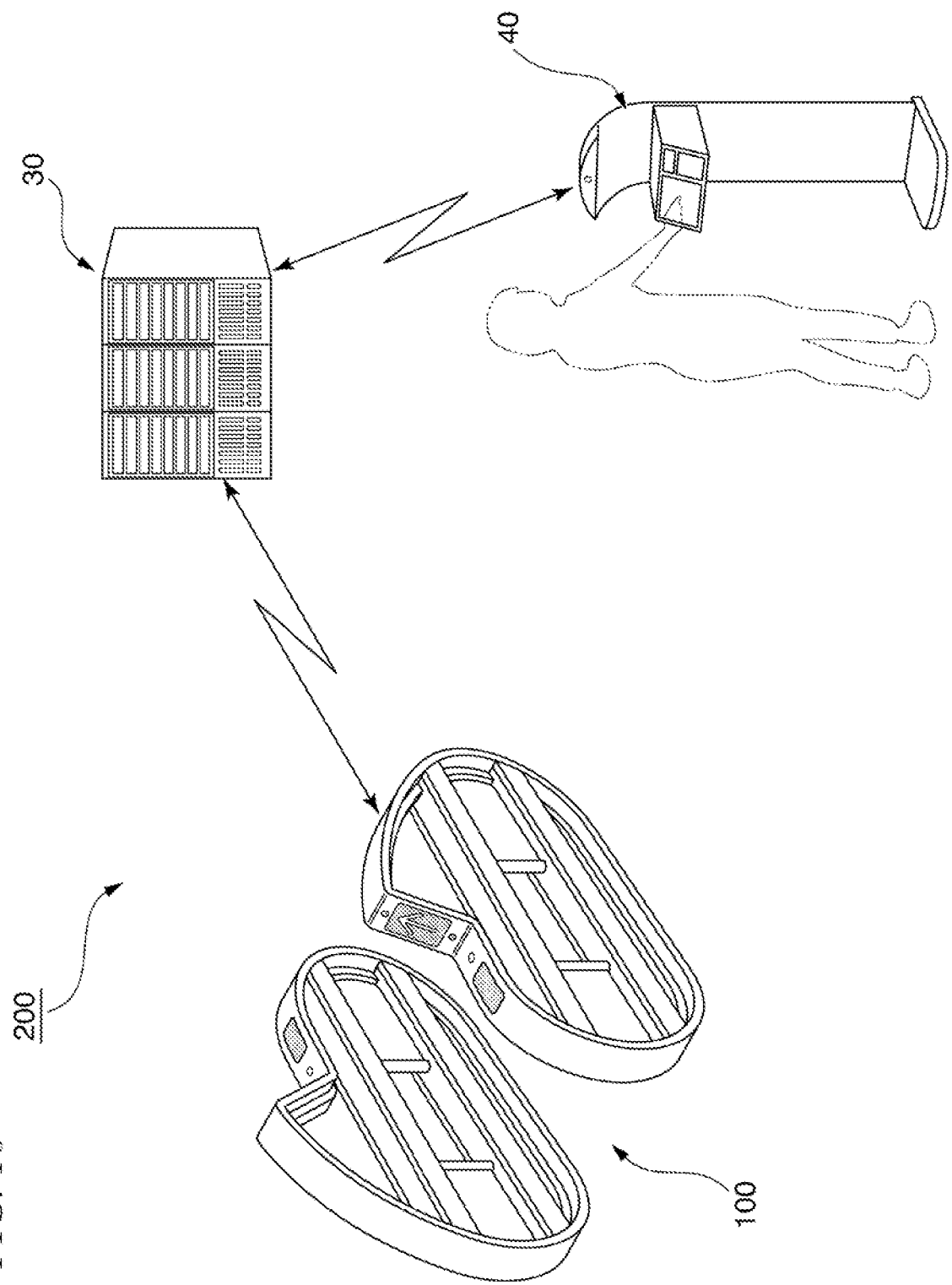
FIG. 10 is a schematic diagram showing a gate system including gate units and a server apparatus.

FIG. 10 shows a gate system including gate units and a server apparatus.

A gate system 200 includes gate units 1, a registration terminal 40, and a server apparatus 30, which are connected together through communication networks.

Figure 11:
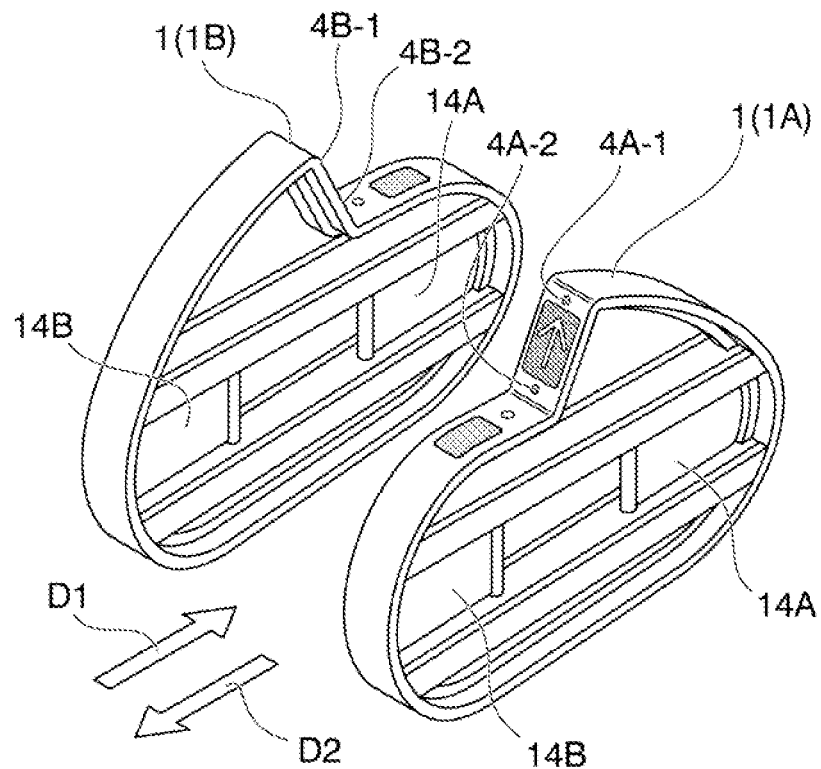
FIG. 11 is a first perspective view of a gate apparatus according to the fourth exemplary embodiment.
Figure 11:
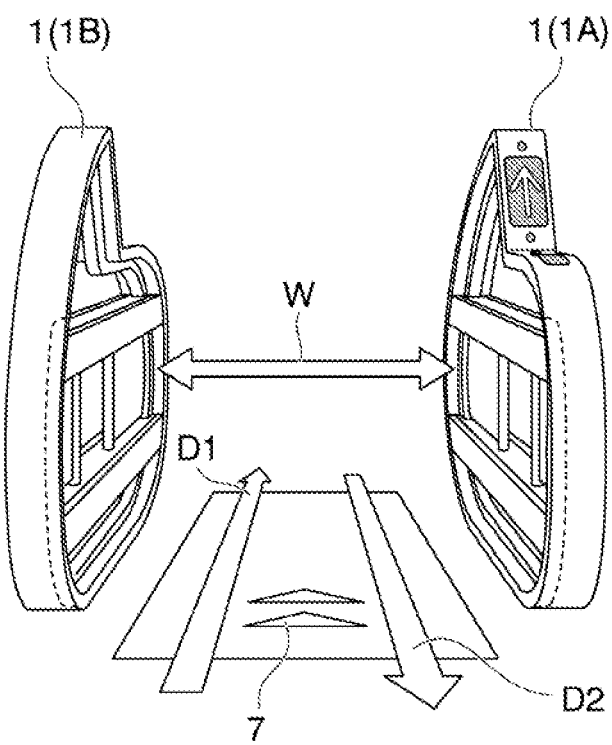

FIG. 11 is a first perspective view of a gate apparatus 100 according to the fourth exemplary embodiment. The gate apparatus 100 illustrated by the fourth exemplary embodiment will be described in detail. The gate apparatus 100 includes a pair of gate units 1A, 1B, wherein the gate units 1 are installed in parallel with each other along a vertical plane perpendicular to the floor with an interval of a width W of a passage area allowing a moving body to bidirectionally pass therethrough on the horizontal plane. A person or the like as the moving object may bidirectionally pass through the passage area in a first direction D1 or a second direction D2.

The gate units 1A, 1B are equipped with first flapper gates 14A for preventing a person serving as a moving object from passing through the passage area in the first direction D1. In addition, the gate units 1A, 1B are equipped with second flapper gates 14B for preventing a person serving as a moving object from passing through the passage area in the second direction D2.

The gate unit 1A is equipped with an image acquisition unit 4A-1 disposed above the display 3 and an image acquisition unit 4A-2 disposed below the display 3. That is, the gate unit 1A is equipped with a pair of image acquisition units 4A-1, 4A-2 configured to capture an image of a person serving as a moving object passing through the passage area in the first direction D1. In addition, the gate unit 1B is equipped with an image acquisition unit 4B-1 disposed above the display 3 and an image acquisition unit 4B-2 disposed below the display 3. That is, the gate unit 1A is equipped with a pair of image acquisition units 4A-1, 4A-2 configured to capture an image of a person serving as a moving object passing through the passage area in the first direction D2.

Accordingly, the gate apparatus 100 is configured to acquire a first image captured by the image acquisition units 4A-1, 4A-2 attached to the gate unit 1A and a second image captured by the image acquisition units 4B-1, 4B-2 attached to the gate unit 1B. The gate apparatus 100 controls the first flapper gates 14A or the second flapper gates 14B to open or close the passage area based on at least one of the first image and the second image.

Specifically, upon detecting a person attempting to pass through the passage area in the first direction D1 based on the first image, the gate apparatus 100 controls the first flapper gates 14A to close the passage area which the person may attempt to pass through in the first direction D1.

Upon detecting a person attempting to pass through the passage area in the second direction D2 based on the second image, the gate apparatus 100 controls the second flapper gates 14B to close, which prevents the person from passing therethrough in the second direction D2.

According to the fourth exemplary embodiment, a pair of first flapper gates 14A are arranged in the front side of a person's moving direction as the first direction D1 in the passage area defined by a pair of gate units 1A, 1B. In addition, a pair of second flapper gates 14B are arranged in the front side of a person's moving direction as the second direction D2 in the passage area defined by a pair of gate units 1A, 1B. In other embodiments, a pair of first flapper gates 14A may be arranged in the rear side of a person's moving direction as the first direction D1 in the passage area defined by a pair of gate units 1A, 1B. In this case, a pair of second flapper gates 14B may be arranged in the rear side of a person's moving direction as the second direction D2 in the passage area defined by a pair of gate units 1A, 1B.

Figure 12:
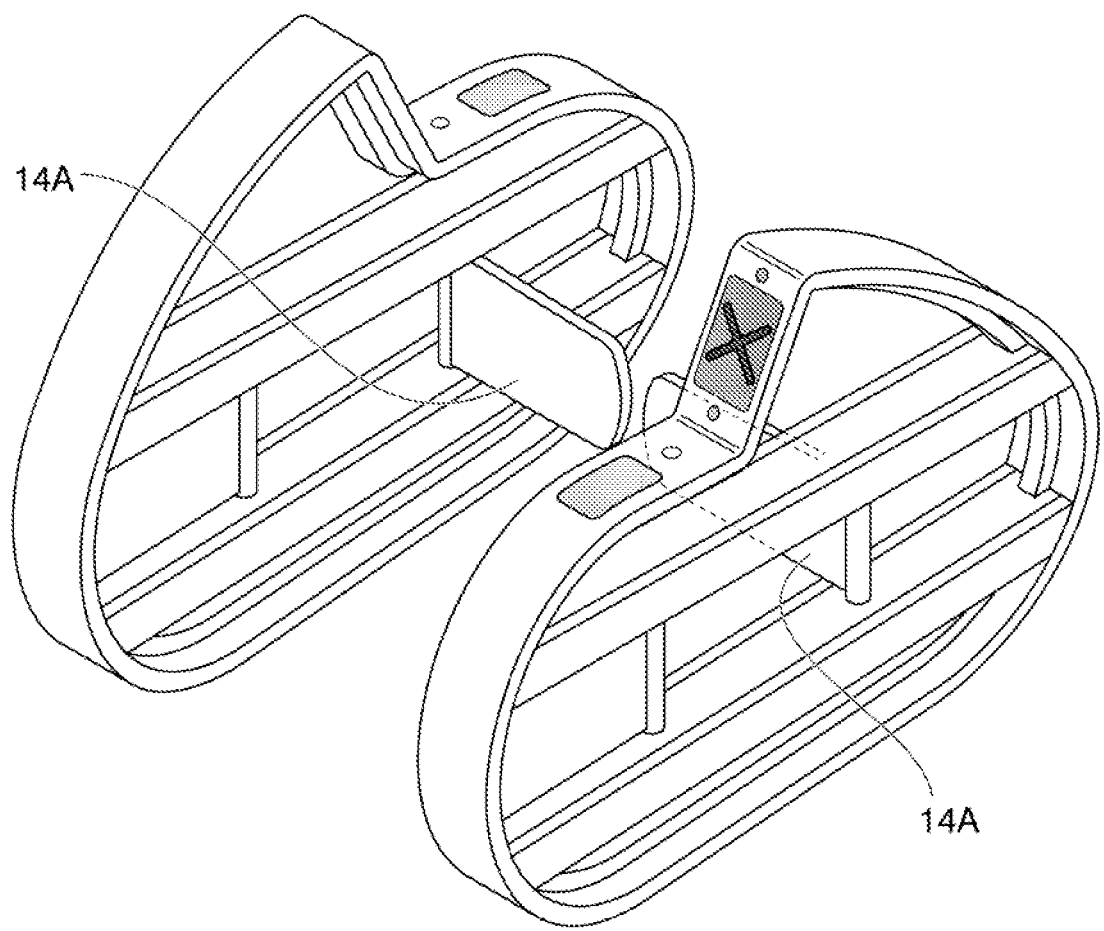
FIG. 12 is a second perspective view of the gate apparatus according to the fourth exemplary embodiment.

FIG. 12 is a second perspective view of the gate apparatus 100 according to the fourth exemplary embodiment. As described in the first exemplary embodiment, as shown in FIG. 12, when the flapper gates 14A are controlled to close the passage therebetween, the gate apparatus 100 is configured to prevent a passenger from passing through the passage since each flapper gate 14A rotates about a vertical axis provided along one vertical side of each flapper gate 14A having a rectangular shape. FIG. 12 shows an exemplary operation in which the first flapper gates 14A arranged in the front side of a passenger's moving direction as the first direction D1 are controlled to close the passage when an authentication result of a passenger who attempts to pass through the passage in the first direction D1 indicates prohibition of passage.

Figure 13:
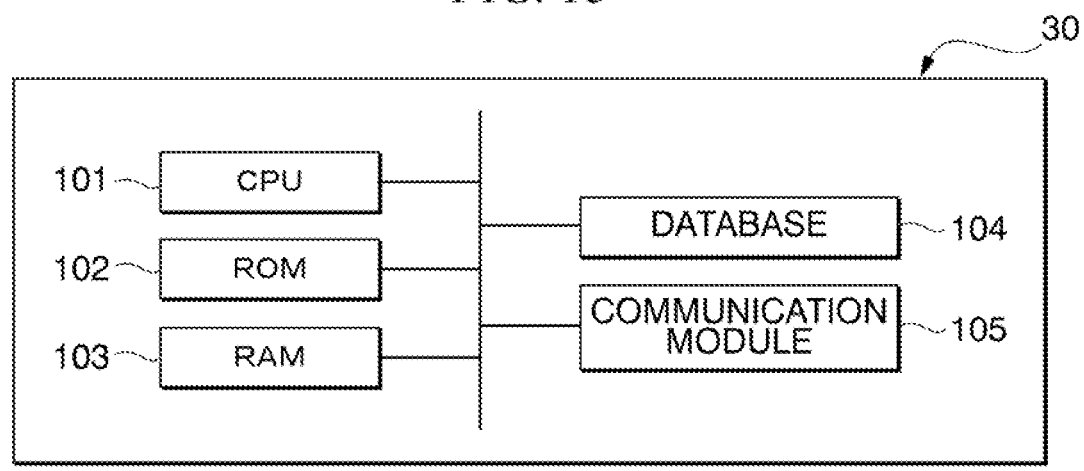
FIG. 13 is a block diagram showing a hardware configuration of the server apparatus.

FIG. 13 is a block diagram showing a hardware configuration of the server apparatus 30.

As shown in FIG. 13, the server apparatus 30 is a computer including various hardware components such as a CPU (Central Processing Unit) 101, a ROM (Read-Only Memory) 102, a RAM (Random-Access Memory) 103, a database 104, and a communication module 105. In this connection, the registration terminal 40 may include a similar hardware configuration.

Figure 14:
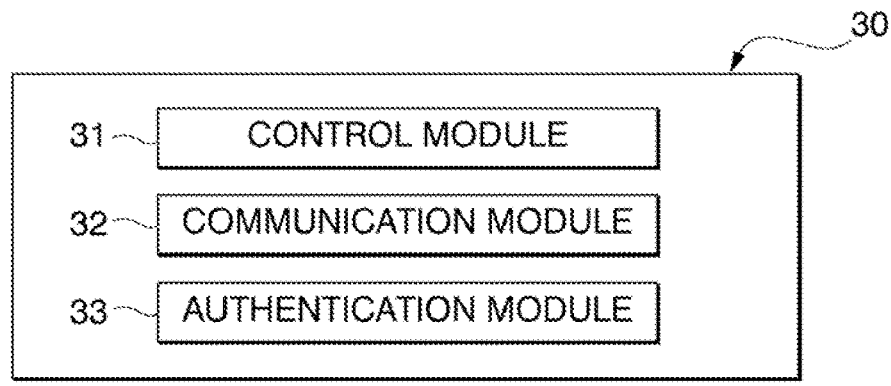
FIG. 14 is a functional block diagram of the server apparatus.

FIG. 14 is a functional block diagram of the server apparatus 30.

The server apparatus 30 is configured to execute a gate-monitoring program. Accordingly, the server apparatus 30 implements various functions such as a control module 31, a communication module 32, and an authentication module 33.

The control module 31 is configured to control the operation of the server apparatus 30.

The communication module 32 is configured to communicate with the gate unit 1.

The authentication module 33 is configured to perform authentication upon request by the gate unit 1, thus outputting an authentication result to the gate unit 1.

Figure 15:
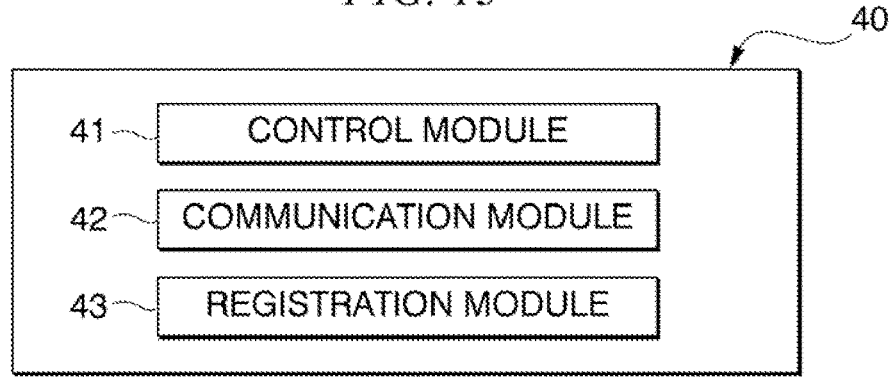
FIG. 15 is a functional block diagram of a registration terminal.

FIG. 15 is a functional block diagram of the registration terminal 40.

The registration terminal 40 is configured to execute a registration program. Accordingly, the registration terminal 40 implements various functions such as a control module 41, a communication module 42, and a registration module 43.

The control module 41 is configured to control the operation of the registration terminal 40.

The communication module 42 is configured to communicate with the server apparatus 30.

The registration module 43 is configured to accept a registration of biological information such as a facial image of a user who may use the gate system 200, a language, a nationality, a passport number, a security number, and pass-ticket information. Those pieces of information are associated with each other and stored on the database 104 of the server apparatus 30.

The registration terminal 40 allows a user to register his/her face and enables the gate apparatus 100 to perform facial recognition. In this case, the user is required to stand in front of the registration terminal 40. Subsequently, the registration terminal 40 detects the user by use of a detection device using infrared rays or the like. In addition, the registration terminal 40 detects the user upon obtaining an image of the user captured by a camera installed therein. The registration terminal 40 generates feature information of a user's face reflected in the captured image. Moreover, the registration terminal 40 accepts an input of user information. The registration terminal 40 may obtain the user information by analyzing a picture attached to a user's license or a user's passport. Alternatively, the registration terminal 40 may obtain the user information from a user's IC card using an IC card reader installed therein. The user information may include various pieces of information representing the boarding section and destination. The registration module 43 of the registration terminal 40 transmits the user information and the user's facial feature information to the server apparatus 30. The server apparatus 30 registers on the database 104 the user information in association with the user's facial feature information.

Figure 16:
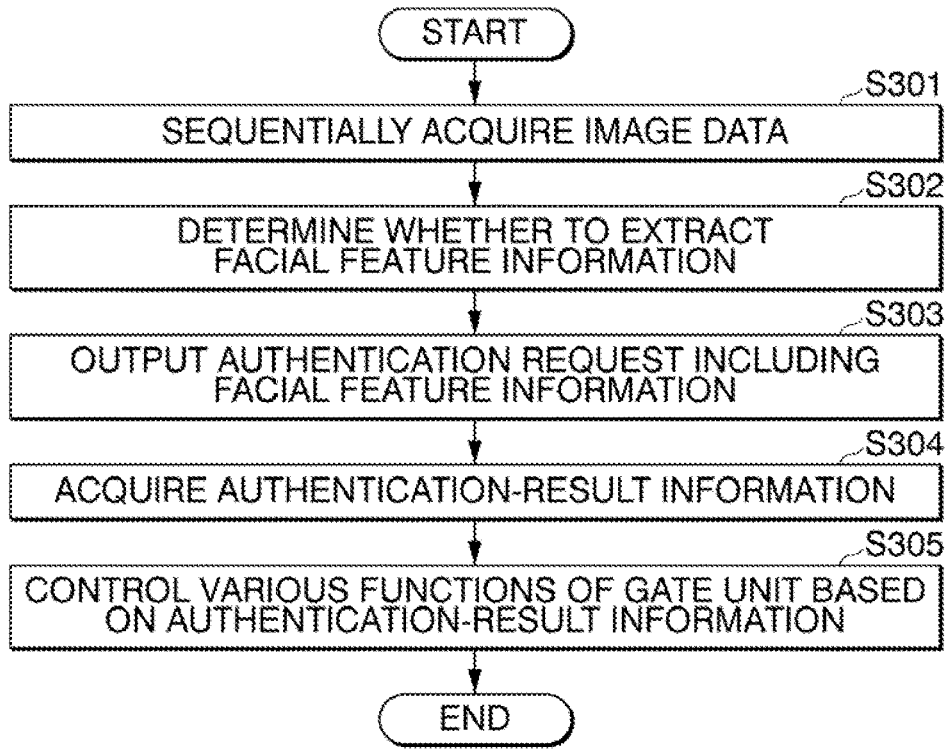
FIG. 16 is a flowchart showing a flow of processing of the gate apparatus according to the fourth exemplary embodiment.

FIG. 16 is a flowchart showing a flow of processing of the gate apparatus 100 according to the fourth exemplary embodiment.

Figure 17:
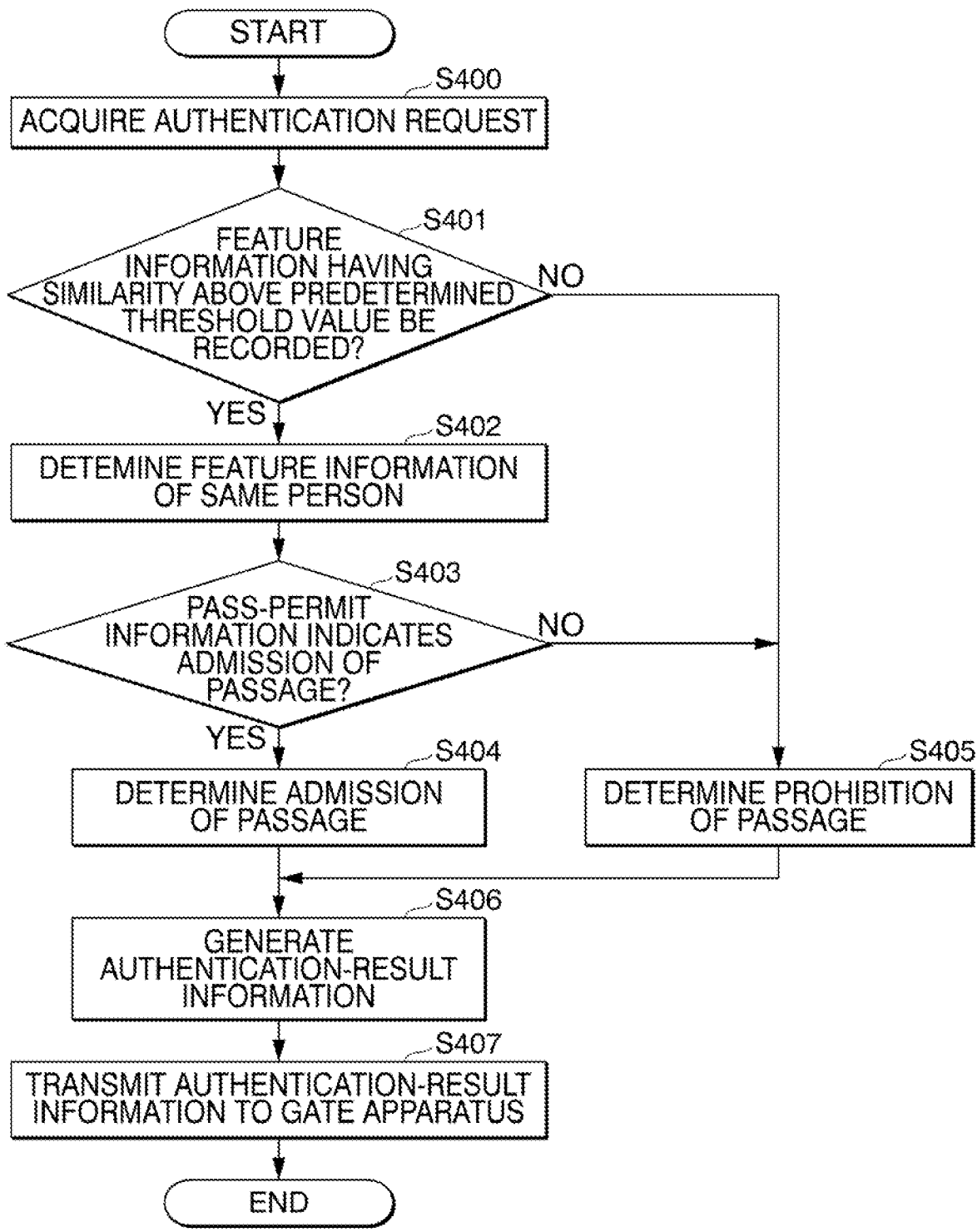
FIG. 17 is a flowchart showing a flow of processing of the server apparatus according to the fourth exemplary embodiment.

FIG. 17 is a flowchart showing a flow of processing of the server apparatus 30 according to the fourth exemplary embodiment.

Next, a flow of processing of the gate system 200 will be described below.

Similar to the second exemplary embodiment, a user may approach a gate-passage between the gate units 1A and 1B. The determination control unit 20 sequentially acquires a series of image data including images captured by the image acquisition units 4 installed in at least one of the gate units 1A and 1B (step S301). Upon acquiring the image data, the determination control unit 20 starts extracting feature quantity of a face reflected in images included in the image data. The acquired image data may store an identifier representing either the gate unit 1A or the gate unit 1B, which is equipped with the image acquisition units 4 configured to transmit the image data.

The determination control unit 20 determines whether to extract the feature information of a person's face from images included in image data (step S302). Upon successfully extracting the facial feature information, an authentication request including the facial feature information is output to the server apparatus 30 (step S303). The authentication request may include a network address and an identifier representing either the gate unit 1A or 1B in addition to the user's facial feature information. The server apparatus 30 has stored in advance on the database 104 the user's facial feature information in association with pass-admission information. The pass-admission information may be defined as special information configured to identify a group of information such as the identification information of the gate unit 1A allowing persons to pass therethrough.

The authentication module 33 of the server apparatus 30 acquires the authentication request (step S400). The authentication module 33 calculates a similarity between the facial feature information included in the authentication request and each of man pieces of facial feature information recorded on the database 104, thus determining whether the facial feature information having a similarity above a predetermined threshold value is recorded on the database 104 (step S401). Upon determining that the facial feature information having a similarity above a predetermined threshold value compared with the facial feature information included in the authentication request is registered in the database 104, the authentication module 33 determines the facial feature information representing the same person as the user whose facial feature information is included in the authentication request (step S402). The authentication module 33 determines whether the pass-admission information associated with the facial feature information representing the same person as the user indicates an admission of passage (step S403). For example, the authentication module 33 determines whether the pass-admission information associated with the facial feature information representing the same person as the user is registered in the database 104 in association with an identifier of either the gate unit 1A or 1B included in the authentication request. The authentication module 33 determines an admission of passage when the pass-admission information associated with the facial feature information representing the same person as the user is registered in the database 104 in association with an identifier of either the gate unit 1A or 1B included in the authentication request (step S404). In contrast, the authentication module 33 determines prohibition of passage when the facial feature information having a similarity above a predetermined threshold value is not recorded on the database 104 or when the pass-admission information associated with the facial feature information representing the same person as the user is not registered in the database 104 in association with an identifier of either the gate unit 1A or 1B included in the authentication request (step S405).

The authentication module 33 generates authentication-result information representing either an admission of passage or prohibition of passage (step S406). The authentication module 33 stores an identifier of either the gate unit 1A or 1B, which is acquired from the authentication request, in the authentication-result information. Upon determining an admission of passage, the authentication module 33 may store a user's language and pass-ticket information in the authentication-result information. The authentication module 33 transmits the authentication-result information to a network address (of the gate apparatus 100) representing the gate unit 1 included in the authentication request (step S407). The determination control unit 20 of the gate apparatus 100 acquires the authentication-result information (step S304). The determination control unit 20 controls various functions of the gate unit 1 based on the authentication-result information (step S305).

Specifically, the determination control unit 20 acquires an identifier of either the gate unit 1A or 1B so as to determine a user's progressing direction based on the identifier. Upon acquiring the identifier of the gate unit 1A from the authentication-result information, the determination control unit 20 determines that a user's face can be detected based on a first image captured by the image acquisition units 4A-1, 4A-2 installed in the gate unit 1A, thus determining that the user attempts to walk through the passage in the first direction D1. Upon acquiring the identifier of the gate unit 1B from the authentication-result information, the determination control unit 20 determines that a user's face can be detected based on a second image captured by the image acquisition units 4B-1, 4B-2 installed in the gate unit 1B, thus determining that the user attempts to walk through the passage in the second direction D2. Now, it is assumed that the determination control unit 20 acquires the identifier of the gate unit 1A from the authentication-result information, thus determining that the user attempts to walk through the passage in the first direction D1. In this case, the determination control unit 20 stores the gate unit 1A determined as a control object while storing the first flapper gates 14A determined as the controlled flapper gates 14.

The determination control unit 20 determines whether the authentication-result information includes an admission of passage or prohibition of passage. When the authentication-result information includes the prohibition of passage, the determination control unit 20 produces display information for displaying a symbol "x", characters of "Prohibition of Passage", or a red color representing the prohibition of passage, thus outputting the display information to the display 3 of the gate unit 1A. When the authentication-result information includes the prohibition of passage, the determination control unit 20 controls the gate drive unit 21 to set the open/close state of the first flapper gates 14A as a closed state to prevent the user from passing through the gate apparatus 100 in the first direction D1. This process is one means of processing of the determination control unit 20 to control the open/close timing of the first flapper gates 14A or the second flapper gates 14B in the passage area according to the timing of authenticating a moving object as a person based on a first image or the timing of authenticating a moving object as a person based on a second image.

In this connection, the authentication module 33 of the server apparatus 30 may have a function to authenticate a user wearing a mask based on the feature information representing the skin around the user's eyes. Alternatively, upon detecting a user not wearing a mask, the authentication module 33 may transmit instructive information, which urges the user to wear a mask, to the gate apparatus 100. In this case, the determination control unit 20 may display a guidance urging the user to wear a mask on the display 3 according to the instructive information.

When the authentication-result information includes an admission of passage, the determination control unit 20 produces display information for displaying a symbol "O", characters of "Admission of Passage", or a blue color representing the admission of passage, thus outputting the display information to the display 3 of the gate unit 1A. When the authentication-result information includes an admission of passage, the determination control unit 20 controls the gate drive unit 21 to set the open/close state of the first flapper gates 14A or the second flapper gates 14B to an open state urging the user to pass through the gate apparatus 100. According to this process, the user who may use the gate apparatus 100 can easily confirm his/her usage status of the gate apparatus 100 when passing through the gates.

When the authentication-result information includes an admission of passage, the determination control unit 20 may control a guide device configured to guide the user to pass through the passage area of the gate apparatus 100. Details of this control will be described later.

When the authentication-result information includes an admission of passage, the determination control unit 20 may acquire the user's language and the pass-ticket information included in the authentication-result information. When the authentication-result information includes the pass-ticket information, the determination control unit 20 may output the pass-ticket information to the display 3. When the pass-ticket information represents a boarding section, a destination, and a fare, for example, the determination control unit 20 may output those pieces of information to the display 3. When the authentication-result information includes the user's language, the determination control unit 20 may translate characters output to the display 3 into the user's language so as to output the translated characters to the display 3. That is, upon authenticating a moving object as a person, the determination control unit 20 identifies the language relating to the person so as to change the output information into the output information associated with the identified language.

To receive a guidance or to confirm any problems or failures occurring in the gate apparatus 100 when passing through the gate apparatus 100, the user may have a conversation with a station staff or another manager using the communication function of the gate apparatus 100. When the display 3 of the gate unit 1 has a touch-panel function, for example, the user may use the touch-panel function to change the display screen of the display 3 with an inquiry screen. The user may depress an inquiry button displayed in the inquiry screen. Subsequently, the gate apparatus having the communication function communicates with a remote device equipped with a camera and a microphone. Upon mutually transmitting and receiving the information acquired by the camera and the microphone installed in the gate apparatus 100 and the information acquired by the camera and the microphone installed in the remote device, the user of the gate apparatus 100 may have a conversation with a manager or the like who may operate the remote device. The user's sound and videos will be output to an output device (e.g., a speaker and a monitor) of the remote device. The gate apparatus 100 outputs a manager's video, which is received from the remote device, to the display 3 while outputting a manager's sound via a speaker. The remote device may be facilitated in a control center, a call center, a station office, or the like.

Figure 18:
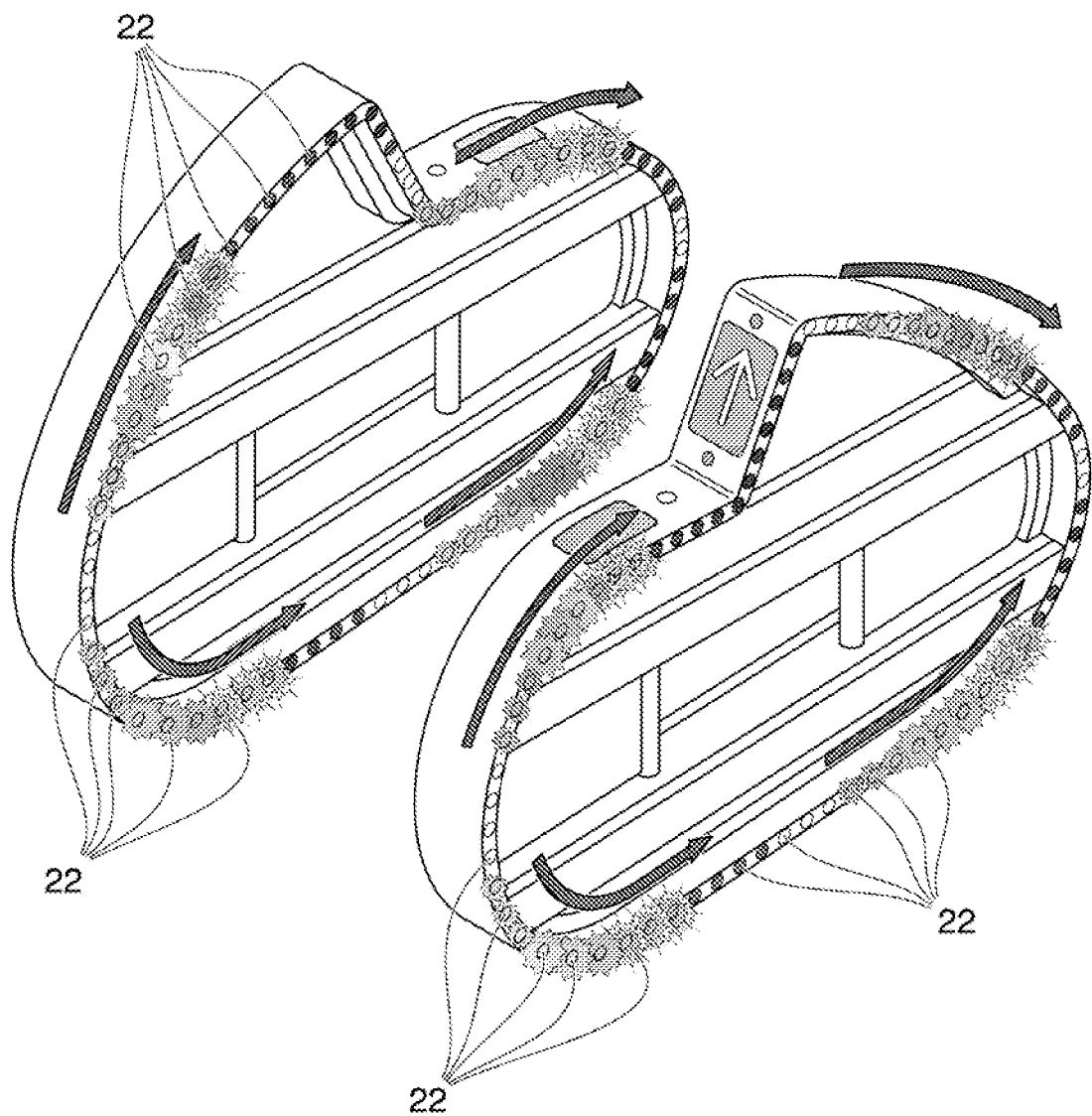
FIG. 18 is a third perspective view of the gate apparatus according to the fourth exemplary embodiment.

FIG. 18 is a third perspective view of the gate apparatus 100 according to the fourth exemplary embodiment.

A plurality of indicators 22 attached to the frame-shaped edges of the gate apparatus 100 as well as the minor-diameter section 11 and/or the major-diameter section 12 which are described in the third exemplary embodiment with reference to FIG. 9 are examples of guide devices. As shown in FIG. 18, upon determining the gate unit 1A as a control object while the authentication-result information includes an admission of passage, the determination control unit 20 controls the band-shaped light-emitting members of the display 8 or multiple points of light which are aligned along edges with predetermined intervals of distance to sequentially emit light in a passage direction (e.g., the first direction D1). In this connection, the indicators 22 can be attached to edges of left and right boards in the gate units 1A, 1B. Accordingly, the determination control unit 20 may control the light emission with respect to the indicators 22 attached to the edges of the left and right boards in the gate unit 1A, 1B or control the light emission with respect to the indicators 22 aligned along the edge(s) in the passage direction alone. As shown in FIG. 18, the determination control unit 20 may control the light-emitting members of the indicators 22 to sequentially emit light in the first direction upon detecting a user's admission of passage in the first direction when controlling the light emission with respect to the light-emitting members of the indicators 22 attached to the edges of the gate apparatus 100. Upon detecting a user's admission of passage in the second direction, the determination control unit 20 may control the light-emitting members of the indicators 22 to sequentially emit light in the second direction. Alternatively, the determination control unit 20 may solely control the light-emitting members of the indicators 22 attached to the upper portions of the gate apparatus 100 to sequentially emit light in a user's progressing direction or the light-emitting members of the indicators 22 attached to the lower portions of the gate apparatus 100 to sequentially emit light in a user's progressing direction. The aforementioned processes may allow a user of the gate apparatus 100 to easily confirm the his/her own usage status when passing through the gates.

Figure 19:
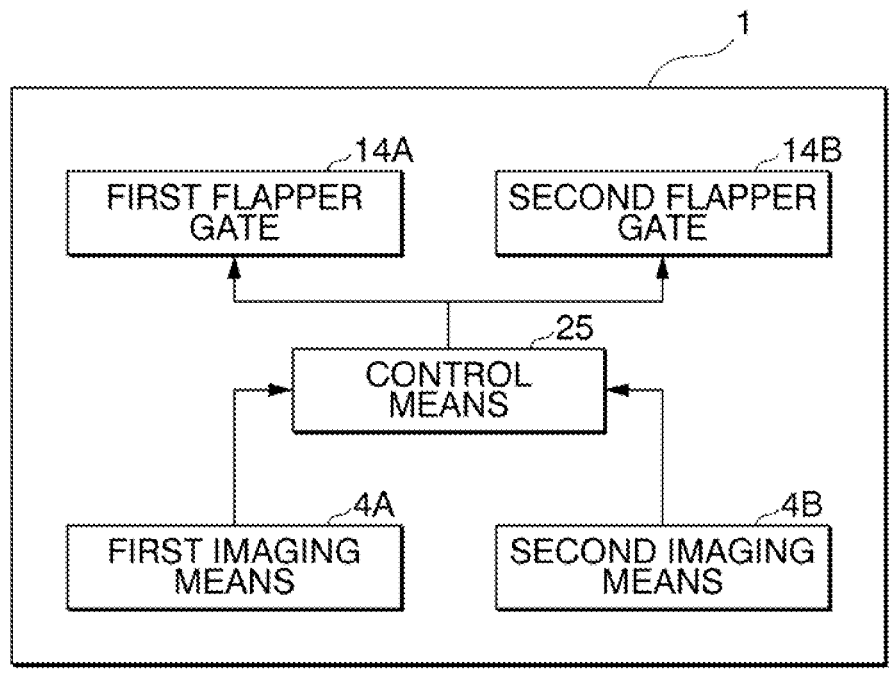
FIG. 19 is a block diagram showing the minimum configuration of the gate apparatus according to the fourth exemplary embodiment.

FIG. 19 is a block diagram showing the minimum configuration of the gate apparatus 100 according to the fourth exemplary embodiment.

Figure 20:
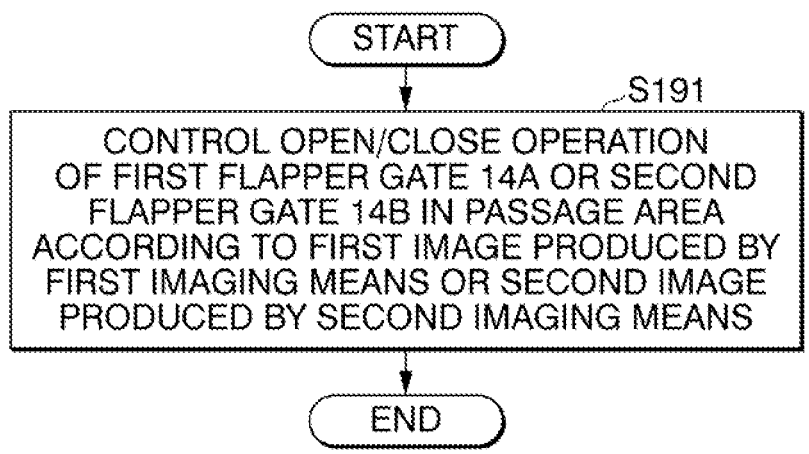
FIG. 20 is a flowchart showing a flow of processing of the gate apparatus having the minimum configuration according to the fourth exemplary embodiment.

FIG. 20 is a flowchart showing a flow of processing of the gate apparatus 100 having the minimum configuration according to the fourth exemplary embodiment.

The gate apparatus 100 includes at least a pair of gate units 1, which are distanced from each other with an interval of a width of a passage area which may allow a moving body to move in opposite directions on the horizontal plane along the vertical plane. A pair of gate units 1 included in the gate apparatus 100 are each equipped with the first flapper gates 14A for preventing a moving object from moving in the first direction within the opposite directions of the passage area and the second flapper gates 14B for preventing a moving object from moving in the second direction within the opposite directions of the passage area. One gate unit among the paired gate units 1 is equipped with a first imaging means 4A which is positioned to capture an image of a moving object moving in the first direction within the opposite directions of the passage area, while the other gate unit among the paired gate units 1 is equipped with a second imaging means 4B which is positioned to capture a image of a moving object moving in the second direction within the opposite directions of the passage area. Subsequently, a control means 25 is configured to control either the first flapper gates 14A or the second flapper gates 14B to open or close in the passage area according to at least one of a first image captured by the first imaging means 4A and a second image captured by the second imaging means 4B (step S191).

Heretofore, the non-limiting embodiment is explained as a gate apparatus having flapper gates, however, the gate apparatus of the non-limiting embodiment does not necessarily include flapper gates.

For example, the foregoing exemplary embodiments can be modified to notify any staffs or security guards standing in proximity to the gate apparatus of the user information with respect to a user whose facial recognition fails or a user whose face is successfully recognized but who may lack enough balance to pay a train fare when irrespective of the determination of the gate apparatus 100 or the server apparatus 30 declaring prohibition of a user's passage, the user has passed through the gate apparatus 100 (or the user attempted to pass through the gate apparatus 100). As the notified information, it is possible to use any types of information such as the information which can identify users using users' facial photos.

In addition, the gate apparatus 100 may notify a user of any information attracting a user's attention with respect to a user whose facial recognition fails or a user whose face is successfully recognized but who may lack enough balance to pay a train fare. As the information-notifying means, it is possible to use any types of means which can provide any information attracting users' attention, such as a means of shining light on an individual point, which can be visually recognized by a user, in an arbitrary color, a means of displaying a message urging a user's attention on a display which can be visually recognized by a user, and a means of producing sound attracting user's attention from a sound-generating member such as a speaker and a buzzer.

As other means for attracting a user's attention, it is possible to display some messages on a display of a mobile terminal such as a smartphone owned by a user or to produce sound from a speaker of a mobile terminal. Accompanied with an operation to attract a user's attention, it is possible to claim a user payment of money due to a shortage of balance or to perform an auto-charging process of paying a predetermined amount of money in association with the ticket information for a user.

In addition, it is possible to freely change the user-notified information according to any reasons by which the gate apparatus determines prohibition of passage. For example, the gate apparatus 100 may notify a message requesting a user to turn his/her face toward the image acquisition units 4 again when the user's facial recognition fails or information requesting a user to charge his/her balance when the user's face is successfully recognized but the user experiences a shortage of balance for fully paying a train fare.

In the foregoing exemplary embodiments, the data read-write unit 5 may be configured to read a user's identification document in addition to the ticket information for boarding a train.

The gate apparatus 100 or the server apparatus 30 may determine whether to permit or prohibit a user to pass through the gates using the user information acquired by the image acquisition units 4 and the identification information which the data read-write unit 5 reads from the user's identification document.

In addition, it is possible for the data read-write unit 5 to acquire a user's payment information (e.g., account information, the registered information of a card-type commuter pass, any information relating to a settlement over a smartphone) (e.g., it is possible to acquire information via communications or by reading the magnetized information of a cash card or a QR code (a registered trademark) (i.e., a Quick-Response code) on a bank-application screen displayed on a display of a smartphone).

The gate apparatus 100 may be configured to make a setting for a user to pass through the gate apparatus 100 via facial recognition using the user's payment information, the user's identification document, and the user information acquired by the image acquisition units 4. As contents of settings, it is possible to mention a setting of charging a ticket fare from a user's account when a user boards a train, a setting of periodically charging a user's balance, and a setting of permitting a user's free boarding of a train in a specific section in a specific duration such as a user's commuter pass. Those settings can be made using a terminal of KIOSK (a registered trademark) facilitated in a station building or a user's own information-processing terminal in addition to the gate apparatus 100.

<Variations>

The foregoing exemplary embodiments are each configured to employ the layout of arranging a display and image acquisition units on one inclined face of a gate unit; however, it is possible to employ different layouts according to variations as follows.

Figure 21:
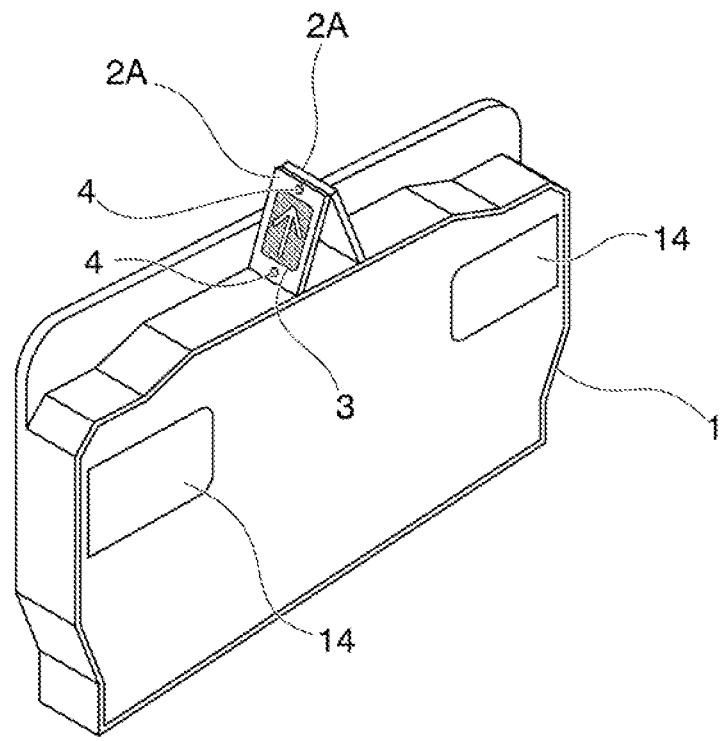
FIG. 21 is a perspective view of a first variation.

Specifically, as shown in FIG. 21, it is possible to form a pair of inclined faces 2A which are adjacently disposed around the upper-center area of the gate unit 1 such that they are oppositely directed to the front side and the rear side of the gate unit 1, wherein the display 3 and the image acquisition units 4 serving as miniature cameras are disposed on each inclined face 2A.

By arranging two sets of the display 3 and the image acquisition units 4 in opposite directions, it is possible for one gate apparatus to carry out a user's facial recognition with respect to each of users who may pass through the gate apparatus in opposite directions.

Figure 22:
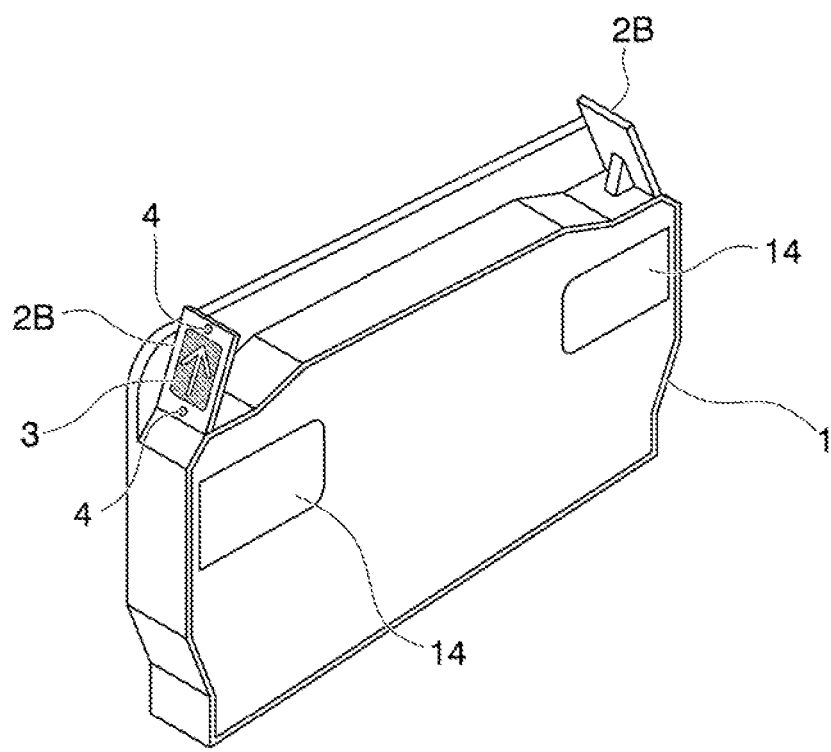
FIG. 22 is a perspective view of a second variation.

As shown in FIG. 22, it is possible to arrange two inclined faces 2B which are distanced from each other and disposed in the front side and the rear side of the gate unit 1 such that they are directed in opposite directions, wherein the display 3 and the image acquisition units 4 are disposed on each inclined face 2B.

By arranging two sets of the display 3 and the image acquisition units 4 on the opposite ends of the gate unit 1 such that they are directed in opposite directions, it is possible for one gate apparatus to carry out a user's facial recognition with respect to each of users who may pass through the gate apparatus in opposite directions, and it is possible for one gate apparatus to accurately capture a facial image at a near position of a user who may pass through the gate apparatus as near as possible (or a user who may approach the gate apparatus from a remote place).

The foregoing exemplary embodiments show examples of applications to gate apparatuses of automatic-gate machines or systems; however, it is obvious for a skilled person in the art to assume other applications to gate apparatuses and systems for managing entrance into and exit from restricted areas.

Heretofore, the foregoing exemplary embodiments are described in detail with reference to the accompanying drawings; however, concrete configurations should not be limited to the foregoing exemplary embodiments; hence, the non-limiting embodiments should embrace design changes or the like without departing from the subject matter of the non-limiting embodiments.

INDUSTRIAL APPLICABILITY

The technology of this disclosure is applicable to gate apparatuses, gate systems, and gate control methods.

REFERENCE SIGNS LIST 1, 1A, 1B, 1C gate unit
2, 2A, 2B inclined face
3 display
4, 4A, 4B image acquisition unit (imaging means)
5 data read-write unit
6 sound input/output unit
7, 8 display
11 minor-diameter bent section
12 major-diameter bent section
13 interconnection member
14 flapper gate
20 determination control unit
21 gate drive unit
30 server apparatus
31 control module
32 communication module
33 authentication module
40 registration terminal
41 control module
42 communication module
43 registration module
A arrow
U1, U2, U3 user
PL1 first plane
PL2 second plane
PL3 third plane

What is claimed is:

1. A gate apparatus comprising:
a gate which is disposed on a second plane crossing a first plane in which an authentication object moves in one direction and which partitions a moving space of the authentication object from another space;
an inclined face which is formed on the gate to cross the first plane and the second plane and which is inclined upwardly from the first plane;
a plurality of lights;
a display configured to display an image on the inclined face;
cameras configured to capture an image of the authentication object in proximity to the display and attached to upper and lower positions of the display;
at least one memory configured to store instructions; and
at least one processor configured to execute the instructions to:
transmit the captured image to a terminal of the authentication object;
receive, from the terminal, an authentication result acquired based on the captured image and a pre-stored image of the authentication object in the terminal; and
emit light from the plurality of lights sequentially in the one direction in a case where the authentication result includes an admission of passage,
wherein the plurality of lights are attached to one edge and another edge of the gate on the second plane, and wherein in a case where the authentication object passes through a passage area of the gate apparatus, the plurality of lights attached to the one edge emit, the one edge facing the passage area.

2. The gate apparatus according to claim 1, wherein the gate has a frame shape defining a predetermined blank area in the second plane.

3. The gate apparatus according to claim 1, wherein a flapper gate which is movable between a crossing position for the authentication object to cross in its moving direction and an escape position for the authentication object to escape from the crossing position is attached to a lower section of the gate, and wherein the inclined face of the gate is positioned above a movable range of the flapper gate.

4. The gate apparatus according to claim 3, wherein the flapper gate is controlled to open or close according to a result of comparison between acquired data acquired by the image acquisition unit and pre-stored data.

5. The gate apparatus according to claim 1, wherein an inclined angle of the incline face is changeable according to the captured image captured.

6. A gate system comprising a plurality of gate apparatuses which are distanced from each other in a direction crossing a first plane with a predetermined interval therebetween, wherein each of the plurality of the gate apparatuses comprises:
a gate disposed on a second plane crossing the first plane in which an authentication object moves in one direction and which partitions a moving space of the authentication object from another space;
an inclined face formed on the gate to cross the first plane and the second plane and inclined upwardly from the first plane;

a plurality of lights;
a display configured to display an image on the inclined face;
cameras configured to capture an image of the authentication object in proximity to the display and attached to upper and lower positions of the display;
at least one memory configured to store instructions; and
at least one processor configured to execute the instructions to:
  transmit the captured image to a terminal of the authentication object;
  receive, from the terminal, an authentication result acquired based on the captured image and a pre-stored image of the authentication object in the terminal; and
  emit light from the plurality of lights sequentially in the one direction in a case where the authentication result includes an admission of passage,
wherein the plurality of lights are attached to one edge and another edge of the gate on the second plane, and
wherein in a case where the authentication object passes through a passage area of the gate apparatus, the plurality of lights attached to the one edge emit, the one edge facing the passage area, and
wherein each of the plurality of the gate apparatus includes a first gate whose inclined face is directed in one direction and a second gate whose inclined face is directed in another direction opposite to one direction.

7. The gate system according to claim 6, wherein the first gate and the second gate are disposed in parallel with each other by oppositely turning their directions of capturing images with their image acquisition units.

8. The gate system according to claim 7, wherein a pair of flapper gates configured to enter into or escape from the moving space of the authentication object moving on the first plane are attached to at least one of the first gate and the second gate unit, and wherein the pair of flapper gates are disposed close to one edge in one direction and another edge in another direction.

9. A gate control method comprising:
  displaying an image on a display face inclined upwardly from a first plane in a gate configured to partition a moving space in which an authentication object moves on the first plane in one direction from another space, wherein a plurality of lights are attached to one edge and another edge of the gate on a second plane crossing the first plane;
  capturing an image of the authentication object in proximity to the display face by cameras attached to upper and lower positions of the display face;
  transmitting the captured image to a terminal of the authentication object;
  receiving, from the terminal, an authentication result acquired based on the captured image and a pre-stored image of the authentication object in the terminal; and
  emitting light from the plurality of lights sequentially in the one direction in a case where the authentication result includes an admission of passage,
  wherein in a case where the authentication object passes through a passage area of the gate apparatus, the plurality of lights attached to the one edge emit, the one edge facing the passage area.

10. The gate apparatus according to claim 1, wherein the image captured in proximity to the display includes a facial image of a person, and
  wherein at least one processor is configured to identify the authentication object based on the facial image of the person, thus controlling the gate based on the identified result.

11. The gate apparatus according to claim 1, wherein the at least one processor is configured to execute the instructions to acquire a pre-registered language in the terminal, and
  the display is configured to notify the authentication object of information in the pre-registered language.

12. The gate apparatus according to claim 1, wherein lights of the plurality of lights are aligned along an edge of the gate, and an interval between adjacent lights of the plurality of lights is a predetermined interval distance.

13. The gate apparatus according to claim 12, wherein the at least one processor is configured to execute the instructions to:
  emit light from the plurality of lights sequentially in a first direction in response to detection of admission of the authentication object in the first direction; and
  emit light from the plurality of lights sequentially in a second direction in response to detection of admission of the authentication object in the second direction.

14. The gate system according to claim 6, wherein the plurality of lights are attached to one edge of the gate on the second plane and another edge of the gate on the second plane, and wherein in a case where the authentication object passes through a passage area between the first gate and the second gate, the plurality of lights attached to the one edge of the first gate and the plurality of lights attached to the other edge of the second gate emit light, the one edge of the first gate and the other edge of the second gate facing the passage area.

* * * * *